US009432423B2

(12) United States Patent
Evans et al.

(10) Patent No.: US 9,432,423 B2
(45) Date of Patent: *Aug. 30, 2016

(54) SKIP FEATURE FOR A BROADCAST OR MULTICAST MEDIA STATION

(71) Applicant: LEMI TECHNOLOGY, LLC, Wilmington, DE (US)

(72) Inventors: Gregory M. Evans, Raleigh, NC (US); Eugene Matthew Farrelly, Cary, NC (US)

(73) Assignee: LEMI TECHNOLOGY, LLC, Wilmington, DE (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/328,789

(22) Filed: Jul. 11, 2014

(65) Prior Publication Data
US 2014/0325032 A1  Oct. 30, 2014

Related U.S. Application Data

(63) Continuation of application No. 12/882,419, filed on Sep. 15, 2010, now Pat. No. 8,806,047, which is a continuation-in-part of application No. 12/768,980, filed on Apr. 28, 2010, now Pat. No. 8,463,930.

(60) Provisional application No. 61/173,624, filed on Apr. 29, 2009.

(51) Int. Cl.
*H04L 12/18* (2006.01)
*H04L 29/06* (2006.01)
(Continued)

(52) U.S. Cl.
CPC ........ *H04L 65/4092* (2013.01); *H04H 20/106* (2013.01); *H04H 20/28* (2013.01); *H04H 20/40* (2013.01); *H04H 40/18* (2013.01); *H04H 60/27* (2013.01); *H04L 12/18* (2013.01); *H04L 65/4076* (2013.01)

(58) Field of Classification Search
CPC .... H04H 20/28; H04H 40/18; H04H 20/106; H04H 60/27; H04H 20/40
USPC .......................................................... 709/231
See application file for complete search history.

(56) References Cited

U.S. PATENT DOCUMENTS 5,455,570 A  10/1995 Cook et al.
5,682,550 A  10/1997 Brown et al.
(Continued)

FOREIGN PATENT DOCUMENTS

EP         952732       10/1999
WO   WO 2009/070343    6/2009

OTHER PUBLICATIONS

Lingnau et al., "An HTTP-based Infrastructure for Mobile Agents," at <http://www.w3.org/Conferences/WWW4/Papers/150/>, 1995, pp. 1-15, printed Dec. 20, 1999, 15 pages.
(Continued)

*Primary Examiner* — Khaled Kassim
*Assistant Examiner* — Syed S Ali

(57) ABSTRACT

A skip function for broadcast or multicast media content is disclosed. In general, a receiving device simultaneously receives two or more content streams transmitted for one or more receiving device and provides a skip function by buffering and switching between the two or more content streams. Initially, the receiving device provides playback of a first content stream of the two or more content streams. During playback of the first content stream, the receiving device buffers one or more most recently received content items from the other content streams. When a skip request is received, the receiving device performs a skip function by switching playback from the first content stream to a second content stream of the two or more content streams beginning at the start of the one or more most recently received content items from the second content stream that have been buffered at the receiving device.

16 Claims, 32 Drawing Sheets

Figure 1:
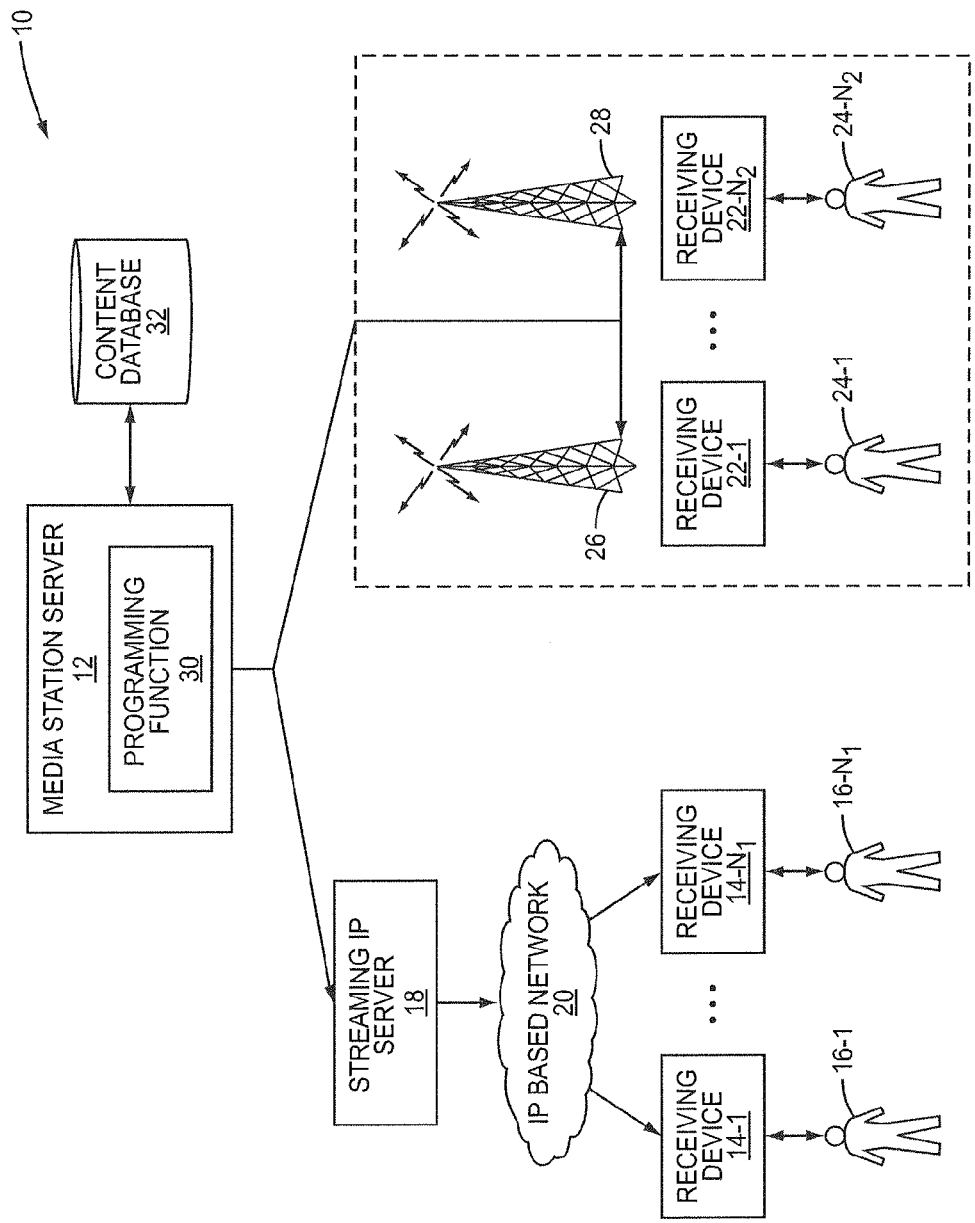

(51) Int. Cl.

| | |
|---|---|
| H04H 20/10 | (2008.01) |
| H04H 20/28 | (2008.01) |
| H04H 20/40 | (2008.01) |
| H04H 40/18 | (2008.01) |
| H04H 60/27 | (2008.01) |

(56) References Cited

U.S. PATENT DOCUMENTS

| | | |
|---|---|---|
| 5,721,827 A | 2/1998 | Logan et al. |
| 5,758,257 A | 5/1998 | Herz et al. |
| 5,790,935 A | 8/1998 | Payton |
| 5,815,662 A | 9/1998 | Ong |
| 5,818,510 A | 10/1998 | Cobbley et al. |
| 5,819,273 A | 10/1998 | Vora et al. |
| 5,855,015 A | 12/1998 | Shoham |
| 5,864,682 A | 1/1999 | Porter et al. |
| 5,873,045 A | 2/1999 | Lee et al. |
| 5,920,856 A | 7/1999 | Syeda-Mahmood |
| 5,926,624 A | 7/1999 | Katz et al. |
| 5,956,716 A | 9/1999 | Kenner et al. |
| 5,974,441 A | 10/1999 | Rogers et al. |
| 5,983,200 A | 11/1999 | Slotznick |
| 5,983,218 A | 11/1999 | Syeda-Mahmood |
| 5,986,692 A | 11/1999 | Logan et al. |
| 6,009,422 A | 12/1999 | Ciccarelli |
| 6,018,768 A | 1/2000 | Ullman et al. |
| 6,029,165 A | 2/2000 | Gable |
| 6,038,591 A | 3/2000 | Wolfe et al. |
| 6,060,997 A | 5/2000 | Taubenheim et al. |
| 6,081,780 A | 6/2000 | Lumelsky |
| 6,088,722 A | 7/2000 | Herz et al. |
| 6,093,880 A | 7/2000 | Arnalds |
| 6,108,686 A | 8/2000 | Williams, Jr. |
| 6,122,757 A | 9/2000 | Kelley |
| 6,125,387 A | 9/2000 | Simonoff et al. |
| 6,128,663 A | 10/2000 | Thomas |
| 6,161,142 A | 12/2000 | Wolfe et al. |
| 6,167,393 A | 12/2000 | Davis, III et al. |
| 6,246,672 B1 | 6/2001 | Lumelsky |
| 6,248,946 B1 | 6/2001 | Dwek |
| 6,263,507 B1 | 7/2001 | Ahmad et al. |
| 6,289,165 B1 | 9/2001 | Abecassis |
| 6,314,094 B1 | 11/2001 | Boys |
| 6,317,784 B1 | 11/2001 | Mackintosh et al. |
| 6,335,927 B1 | 1/2002 | Elliott et al. |
| 6,339,693 B1 | 1/2002 | Chan |
| 6,344,607 B2 | 2/2002 | Cliff |
| 6,345,289 B1 | 2/2002 | Lotspiech et al. |
| 6,349,339 B1 | 2/2002 | Williams |
| 6,377,782 B1 | 4/2002 | Bishop et al. |
| 6,411,992 B1 | 6/2002 | Srinivasan et al. |
| 6,438,579 B1 | 8/2002 | Hosken |
| 6,477,707 B1 | 11/2002 | King et al. |
| 6,487,390 B1 | 11/2002 | Virine et al. |
| 6,496,802 B1 | 12/2002 | van Zoest et al. |
| 6,505,123 B1 | 1/2003 | Root et al. |
| 6,560,651 B2 | 5/2003 | Katz et al. |
| 6,581,103 B1 | 6/2003 | Dengler |
| 6,587,127 B1 | 7/2003 | Leeke et al. |
| 6,588,015 B1 | 7/2003 | Eyer et al. |
| 6,600,898 B1 | 7/2003 | De Bonet et al. |
| 6,609,096 B1 | 8/2003 | De Bonet et al. |
| 6,615,039 B1 | 9/2003 | Eldering |
| 6,628,928 B1 | 9/2003 | Crosby et al. |
| 6,662,231 B1 | 12/2003 | Drosset et al. |
| 6,684,249 B1 | 1/2004 | Frerichs et al. |
| 6,697,824 B1 | 2/2004 | Bowman-Amuah |
| 6,748,237 B1 | 6/2004 | Bates et al. |
| 6,879,963 B1 | 4/2005 | Rosenberg |
| 6,981,040 B1 | 12/2005 | Konig et al. |
| 6,985,694 B1 | 1/2006 | De Bonet et al. |
| 7,020,710 B2 | 3/2006 | Weber et al. |
| 7,028,082 B1 | 4/2006 | Rosenberg et al. |
| 7,031,931 B1 | 4/2006 | Meyers |
| 7,043,747 B1 | 5/2006 | Cohen |
| 7,058,694 B1 | 6/2006 | De Bonet et al. |
| 7,079,807 B1 | 7/2006 | Daum et al. |
| 7,102,067 B2 | 9/2006 | Gang et al. |
| 7,133,924 B1 | 11/2006 | Rosenberg et al. |
| 7,340,761 B2 | 3/2008 | Billmaier |
| 7,657,337 B1 | 2/2010 | Evans et al. |
| 7,711,838 B1 | 5/2010 | Boulter et al. |
| 7,840,691 B1 | 11/2010 | De Bonet et al. |
| 8,028,081 B2 | 9/2011 | Kandekar et al. |
| 8,571,465 B2 | 10/2013 | Eastman et al. |
| 8,583,555 B1 | 11/2013 | Issa et al. |
| 8,806,047 B2 | 8/2014 | Evans et al. |
| 2001/0025259 A1 | 9/2001 | Rouchon |
| 2001/0051852 A1 | 12/2001 | Sundaravel et al. |
| 2002/0010759 A1 | 1/2002 | Hitson et al. |
| 2002/0023270 A1 | 2/2002 | Thomas et al. |
| 2002/0053078 A1 | 5/2002 | Holtz et al. |
| 2002/0116082 A1 | 8/2002 | Gudorf |
| 2002/0116517 A1* | 8/2002 | Hudson et al. ............... 709/231 |
| 2002/0138630 A1 | 9/2002 | Solomon et al. |
| 2002/0183059 A1 | 12/2002 | Noreen et al. |
| 2003/0018797 A1* | 1/2003 | Dunning et al. .............. 709/231 |
| 2003/0103644 A1 | 6/2003 | Klayh |
| 2003/0236843 A1 | 12/2003 | Weber et al. |
| 2006/0072724 A1 | 4/2006 | Cohen et al. |
| 2006/0206478 A1 | 9/2006 | Glaser et al. |
| 2006/0212442 A1 | 9/2006 | Conrad et al. |
| 2007/0101379 A1* | 5/2007 | Pereira ............... H04N 21/2404 725/90 |
| 2008/0163290 A1* | 7/2008 | Marko ................. G11B 27/034 725/32 |
| 2009/0070597 A1 | 3/2009 | Shah et al. |
| 2009/0285155 A1 | 11/2009 | Scarpa et al. |
| 2009/0320075 A1* | 12/2009 | Marko ................... H04H 20/40 725/56 |
| 2010/0005501 A1* | 1/2010 | Stokking ................ G10H 1/365 725/115 |
| 2010/0095337 A1 | 4/2010 | Dua |
| 2010/0135489 A1 | 6/2010 | Ziesler |
| 2010/0218227 A1* | 8/2010 | Frink ................. H04N 7/17327 725/93 |
| 2010/0218231 A1* | 8/2010 | Frink ................. H04N 7/17318 725/118 |
| 2010/0223392 A1 | 9/2010 | Pond et al. |
| 2010/0268361 A1* | 10/2010 | Mantel et al. .................. 700/94 |
| 2010/0304663 A1 | 12/2010 | Michalski et al. |
| 2012/0042337 A1 | 2/2012 | De Bonet et al. |
| 2012/0064820 A1 | 3/2012 | Bemmel |
| 2012/0066403 A1 | 3/2012 | Evans et al. |
| 2012/0246689 A1 | 9/2012 | Thomas et al. |
| 2012/0266076 A1 | 10/2012 | Lockhart et al. |
| 2013/0003993 A1* | 1/2013 | Michalski ............. H04H 20/74 381/119 |
| 2013/0129309 A1* | 5/2013 | Panje ................. H04N 21/4325 386/230 |
| 2013/0231070 A1 | 9/2013 | DeLuca et al. |
| 2014/0025839 A1* | 1/2014 | Marko ................... H04H 20/42 709/231 |

OTHER PUBLICATIONS

Egyhazy et al., "Intelligent Web Search Agents," at <http://csgrad.cs.vt.edu/~tplunket/article.html>, pp. 1-23, printed Dec. 20, 1999, 23 pages.

"FAQ," at <http://blog.pandora.com/faq/>, copyright 2005-2006, Pandora Media, Inc., printed Aug. 8, 2006, 20 pages.

Madan, Sameer, "Search the Web without a headache," PC World (India), pp. 40-41, Feb. 1998, printed Dec. 20, 1999, 2 pages.

"Terrestrial to Internet Radio's Big Opportunity," Concert Technology, Dec. 1, 2008, 8 pages.

Smith, Patricia, "WebCompass Takes Web Searching in the Right Direction," Seybold Report on Desktop Publishing, vol. 10, No. 10, pp. 1-9, found at <http://www.seyboldseminars.com/seybold_report/reports/D1010001.htm>, copyright 1996, Seybold Publications Inc., 9 pages.

* cited by examiner

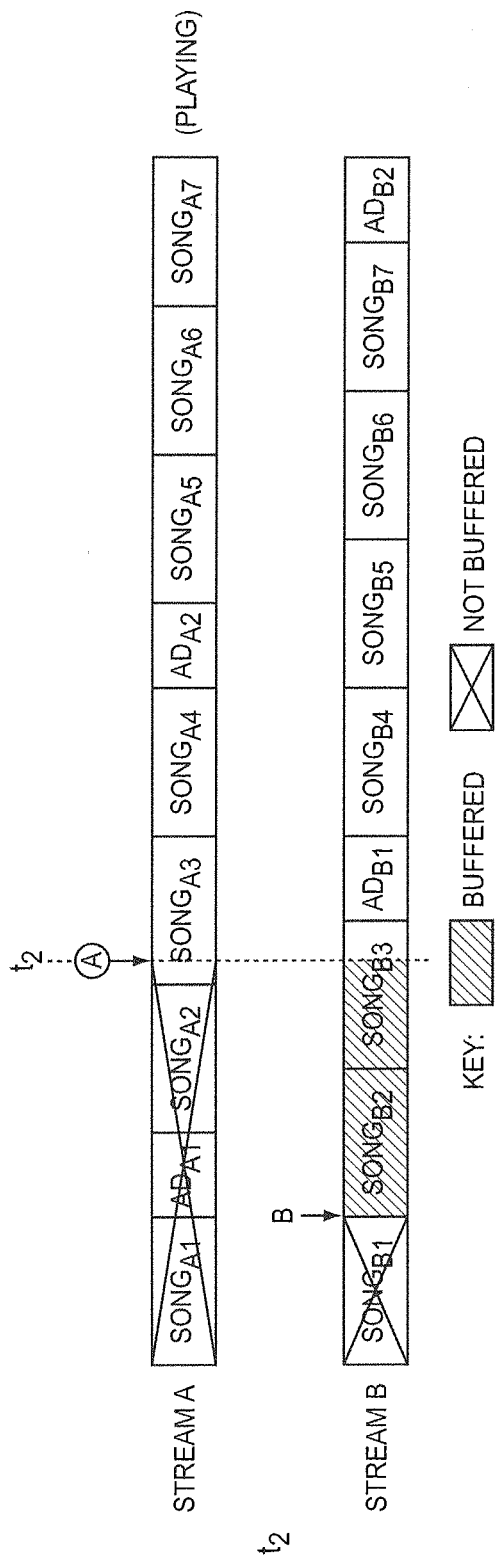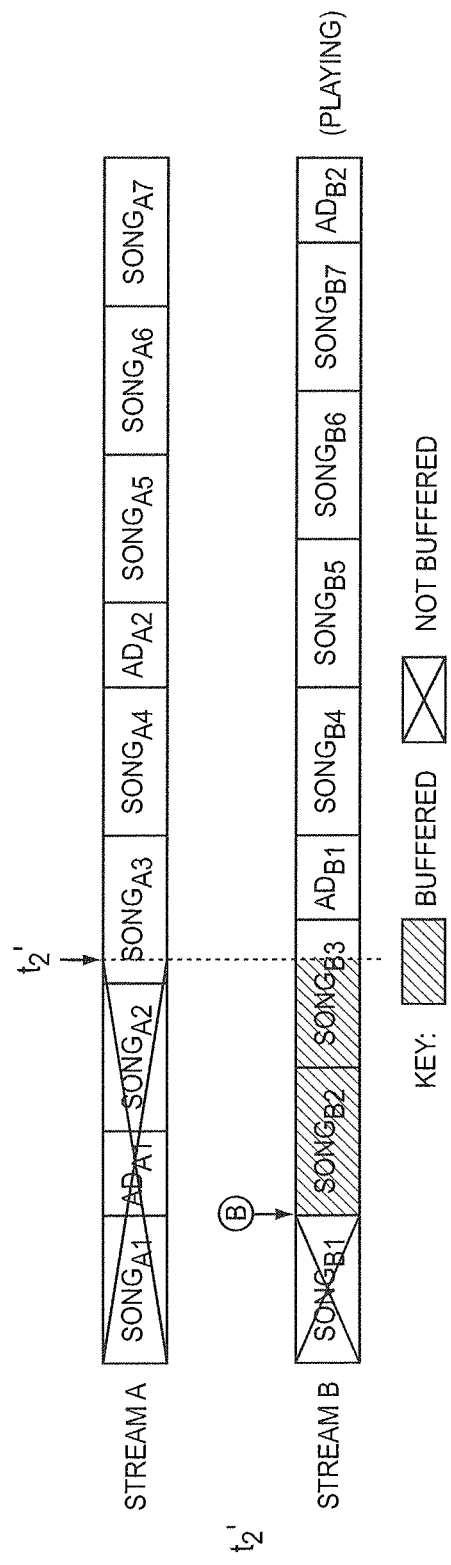

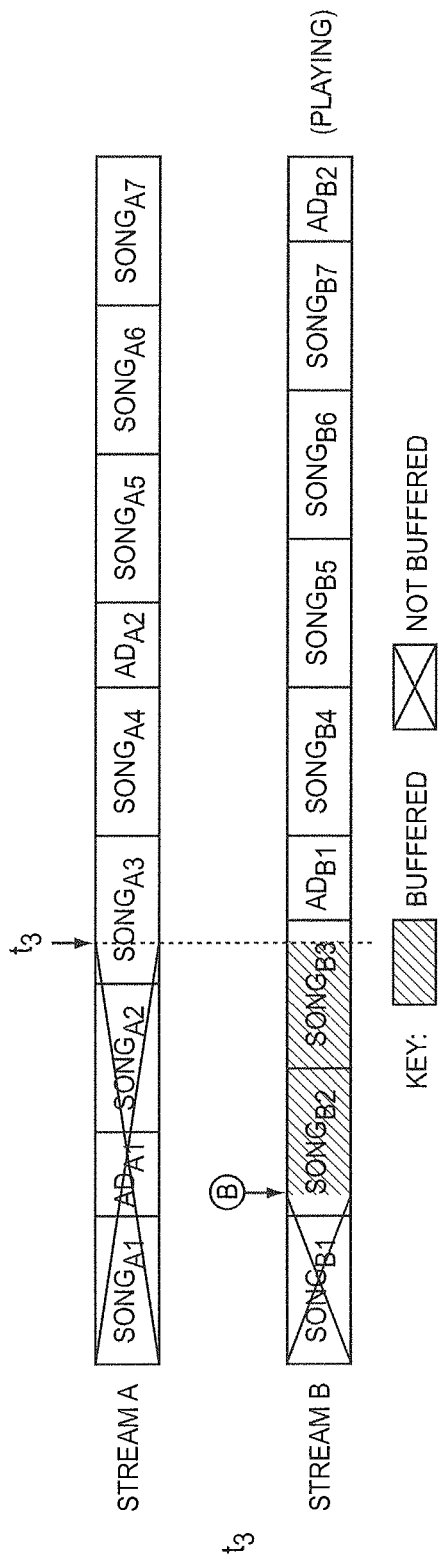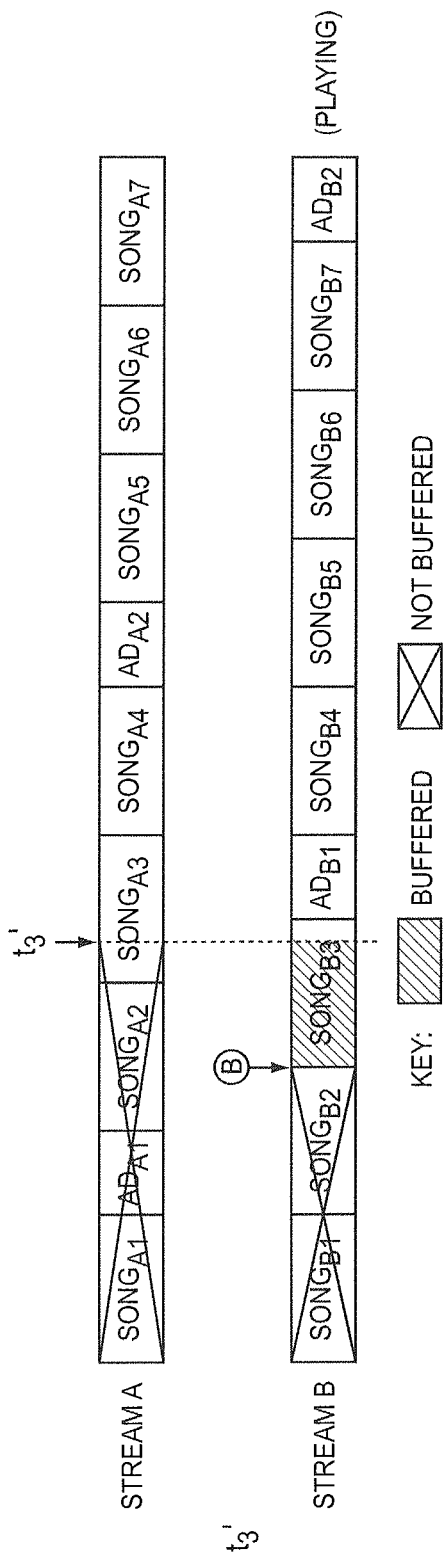

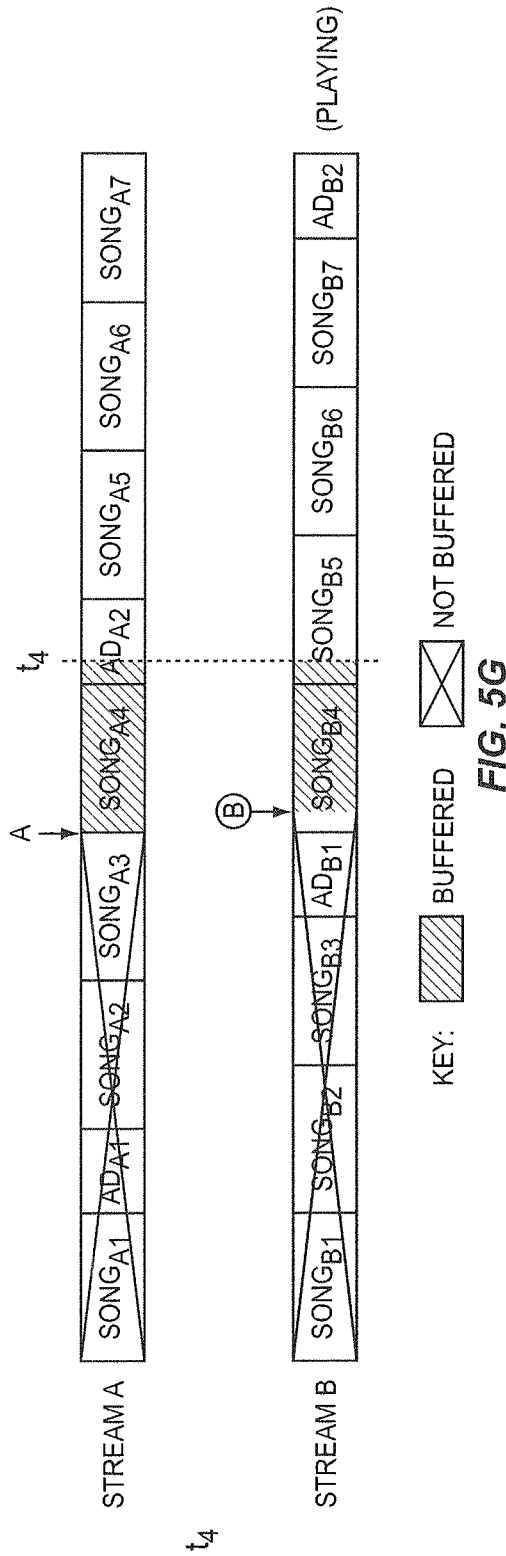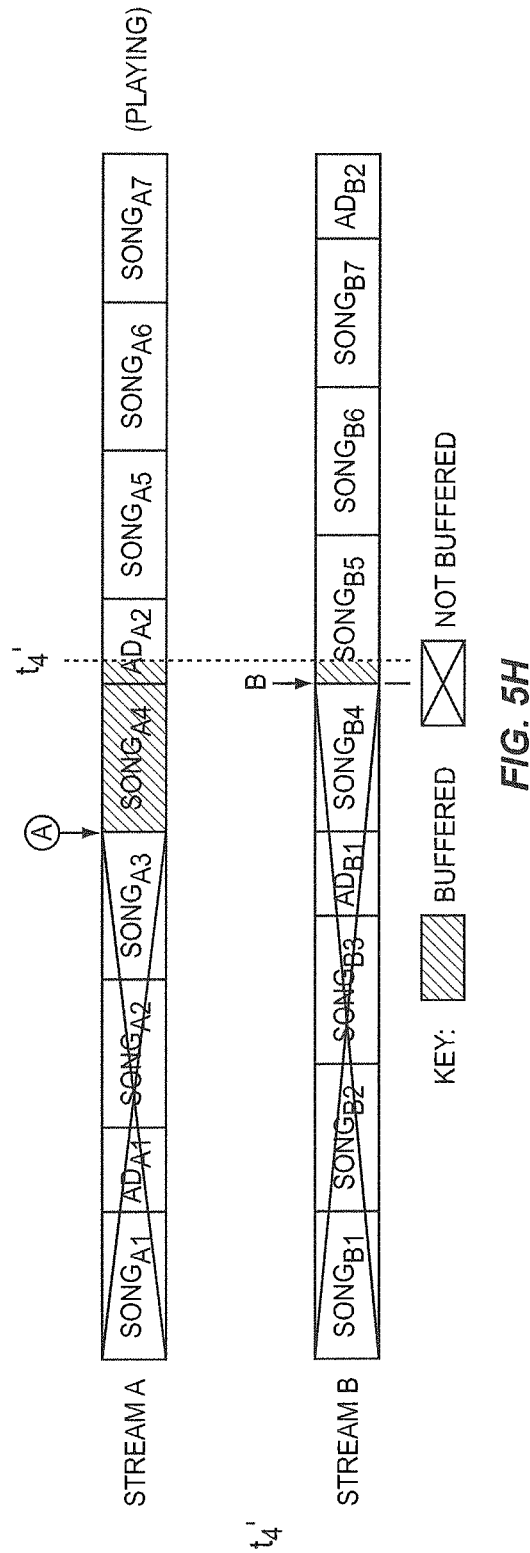

FIG. 7A

FIG. 7B

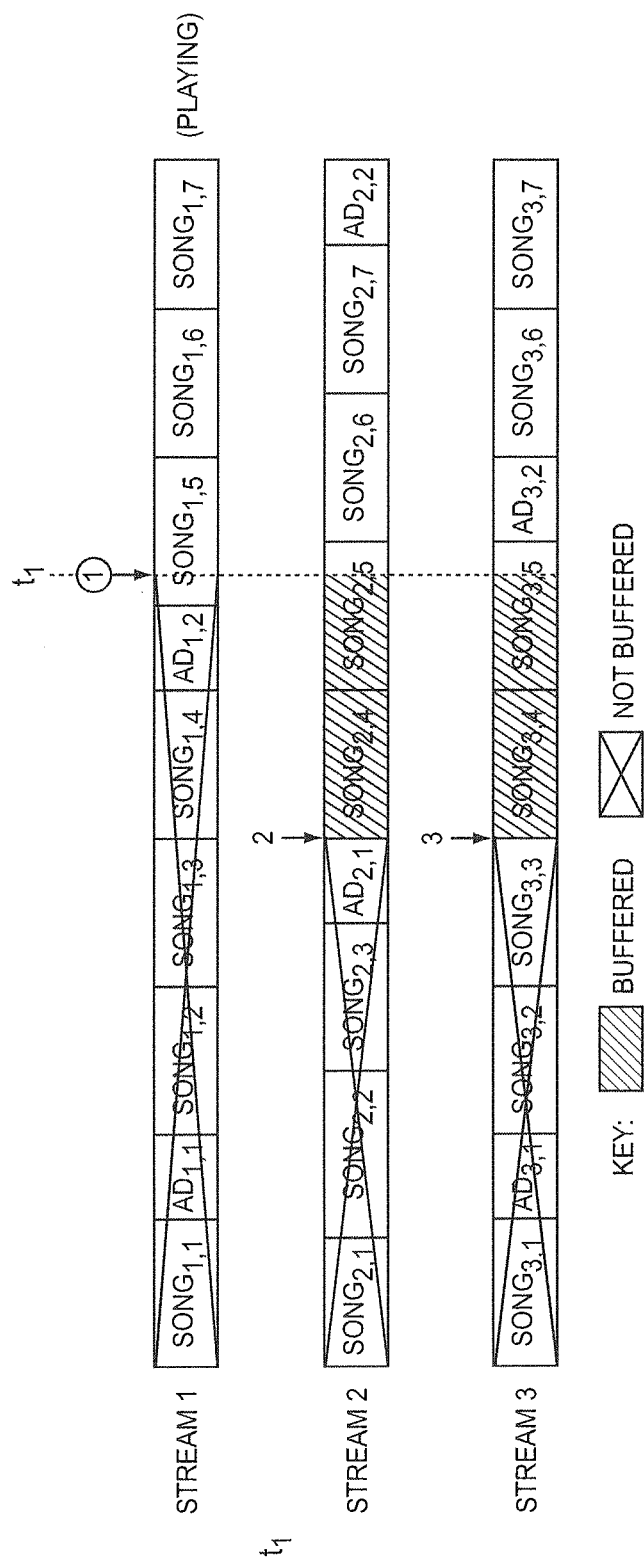

SKIP FEATURE FOR A BROADCAST OR MULTICAST MEDIA STATION

CROSS REFERENCE TO RELATED ASSETS

This application is a Continuation of co-pending U.S. patent application Ser. No. 12/882,419, entitled "Skip Feature For A Broadcast Or Multicast Media Station, which was filed on Sep. 15, 2010, which is a Continuation-In-Part of U.S. patent application Ser. No. 12/768,980 which was filed on Apr. 28, 2010 and claims the benefit of Provisional Patent Application Ser. No. 61/173,624, filed Apr. 29, 2009, the disclosures of which are hereby incorporated herein by reference in their entireties.

FIELD OF THE DISCLOSURE

The present disclosure relates to a skip feature for a broadcast or multicast media content such as that delivered via one or more broadcast or multicast radio stations.

BACKGROUND

Many Internet radio stations provide a skip feature using a unicast communication channel to each user (i.e., each user is delivered a separate radio stream). As such, each user is enabled to independently skip ahead if they do not want to listen to the current song. Such a skip feature is a key feature in that it gives the users listening choices without changing radio stations and provides a means by which users are interactively engaged with the radio station broadcast. This level of engagement allows the radio station or provider to confirm the presence of the user with respect to advertisement impression reporting or song royalty reporting.

However, the current skip features of Internet radio stations that use separate unicast streams to each individual user are inapplicable to broadcast or multicast media stations where multiple users are delivered the same content stream. As such, there is a need for a skip feature for broadcast or multicast media stations.

SUMMARY

A skip function for broadcast or multicast media content is disclosed. In general, a receiving device simultaneously receives two or more content streams transmitted for one or more radio stations and provides a skip function by buffering and switching between the two or more content streams in response to a skip request. Upon simultaneously receiving the two or more content streams, the receiving device provides playback of a first content stream of the two or more content streams. During playback of the first content stream, the receiving device buffers one or more most recently received content items from the other content streams of the two or more content streams. When a skip request is received, the receiving device performs a skip function by switching playback from the first content stream to a second content stream of the two or more content streams beginning at the start of the one or more most recently received content items from the second content stream that have been buffered at the receiving device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 2:
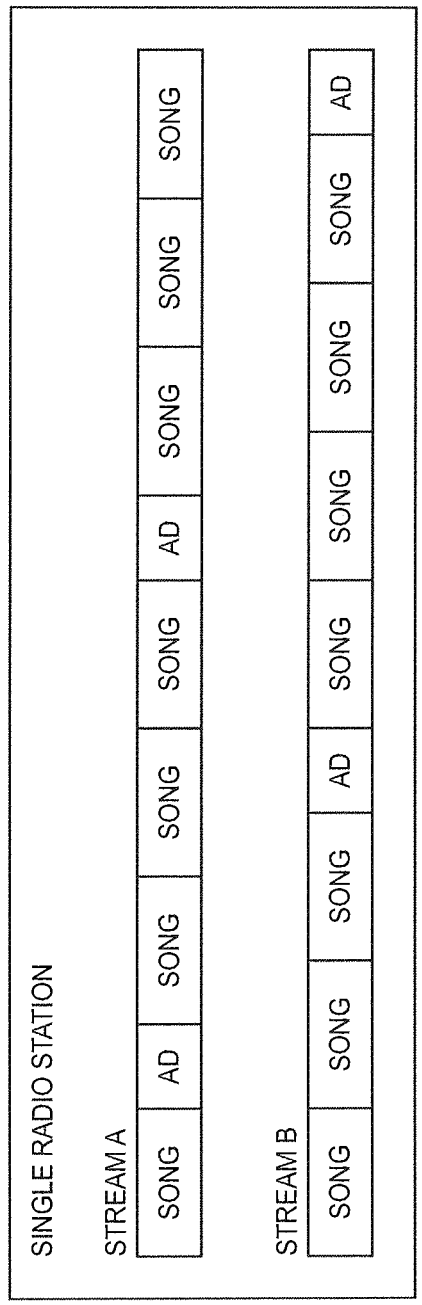
Figure 3:
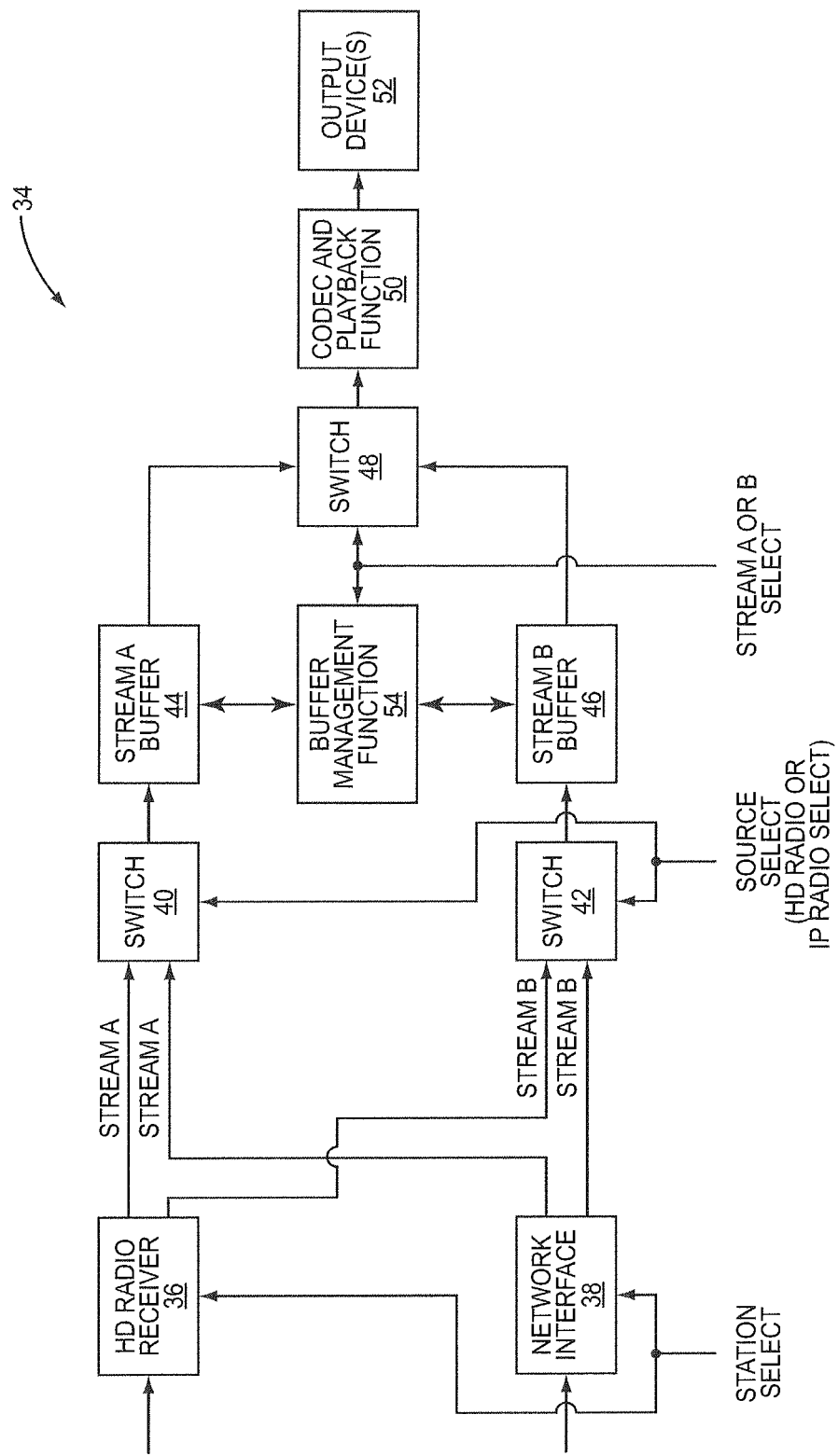
Figure 6:
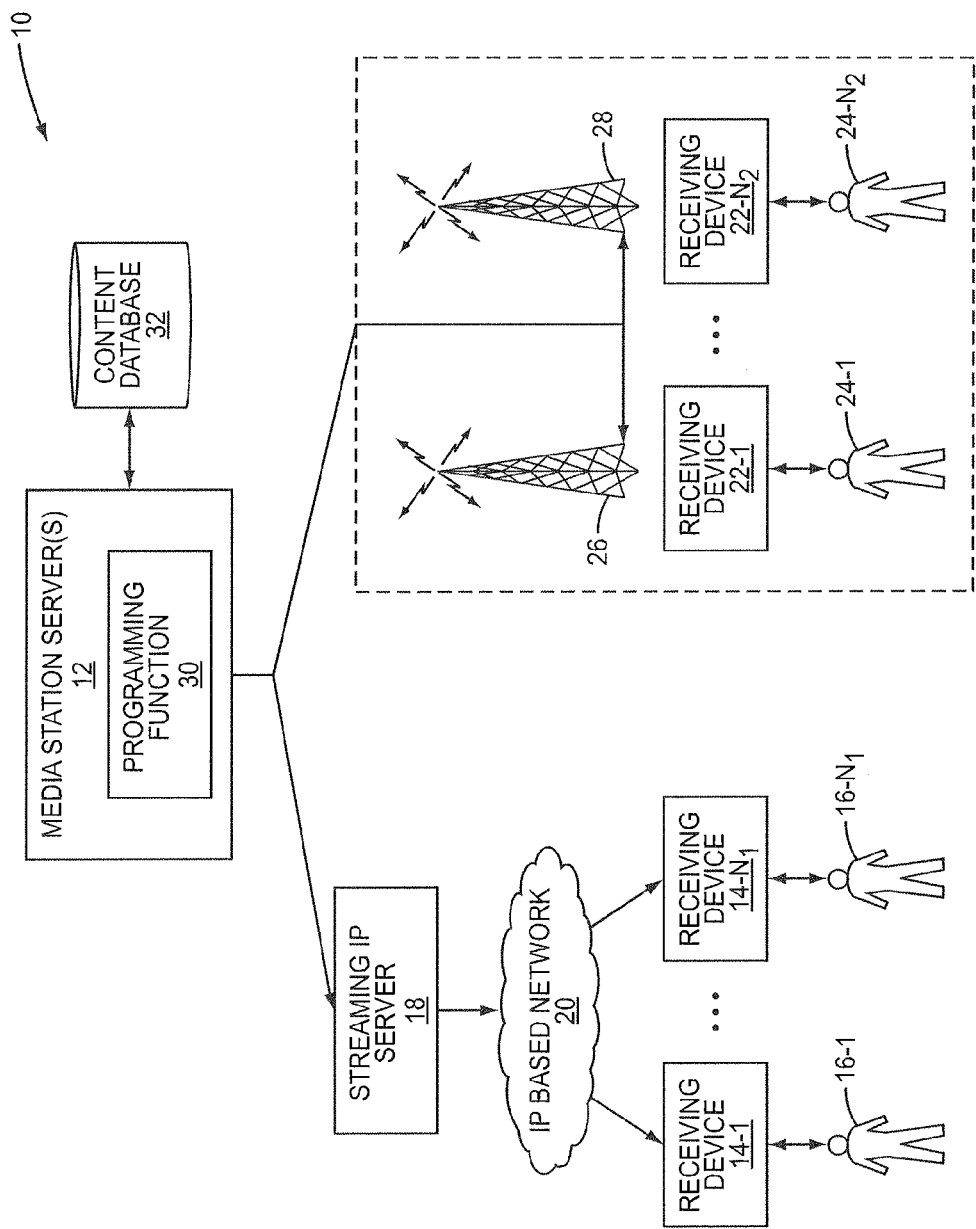
Figure 8:
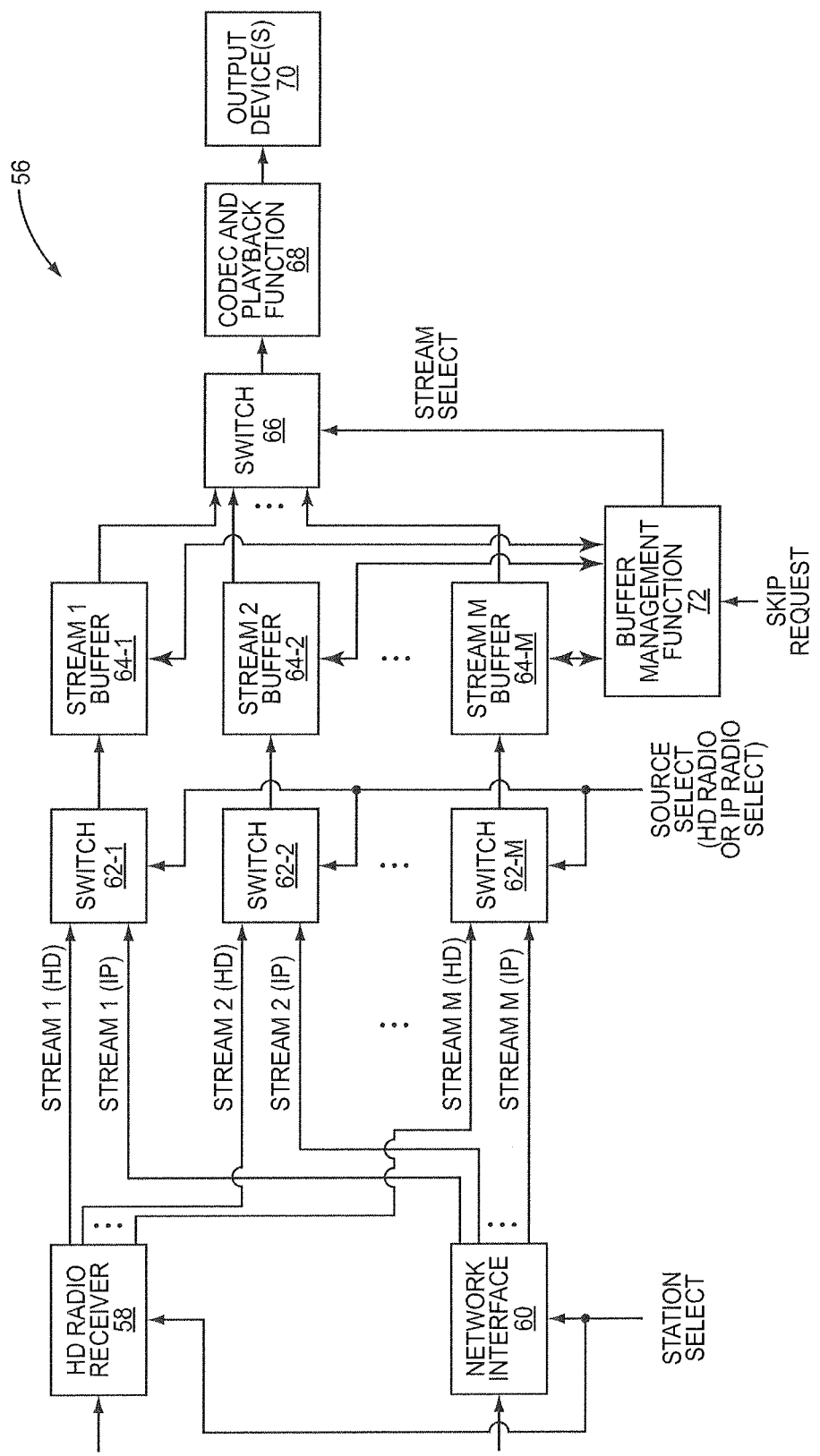
Figure 10A:
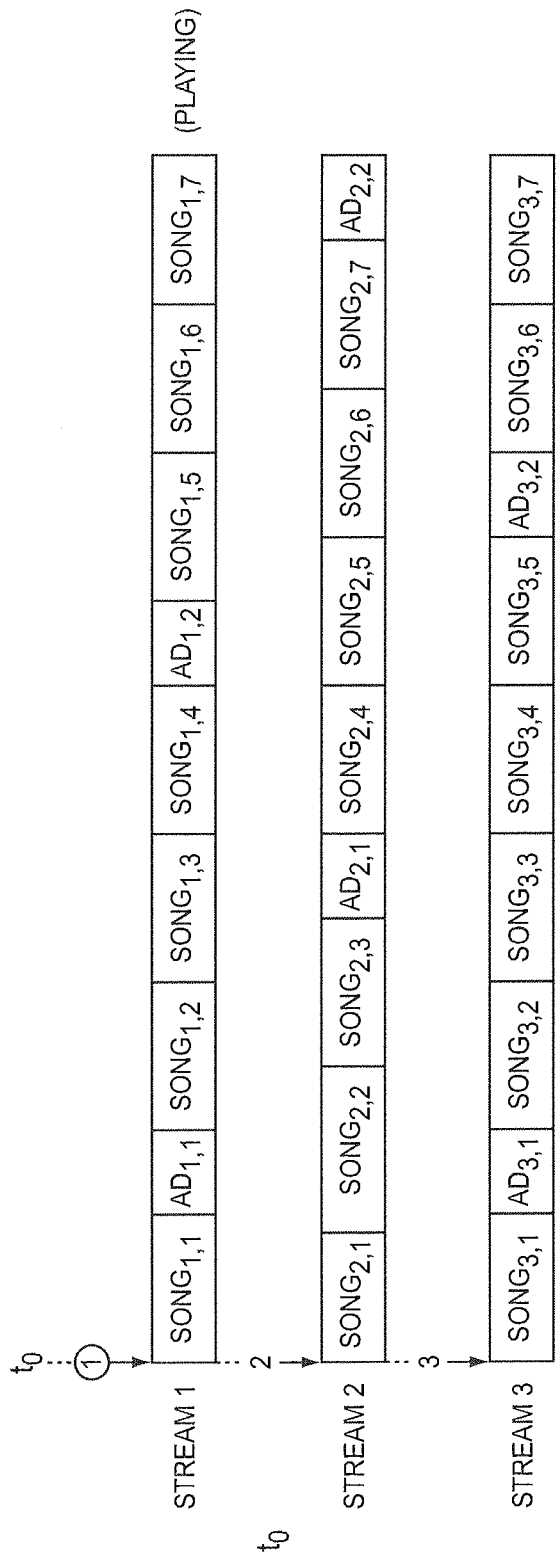
Figure 10B:
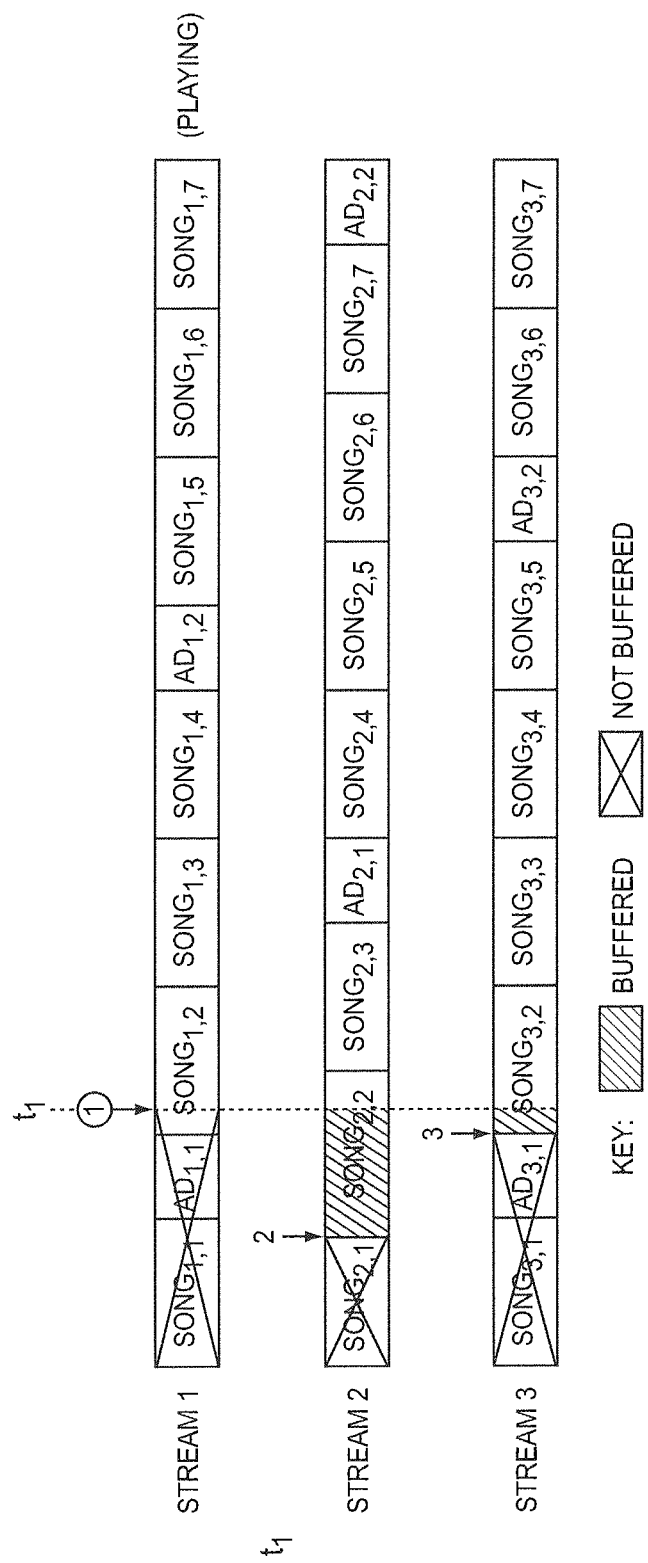
Figure 10C:
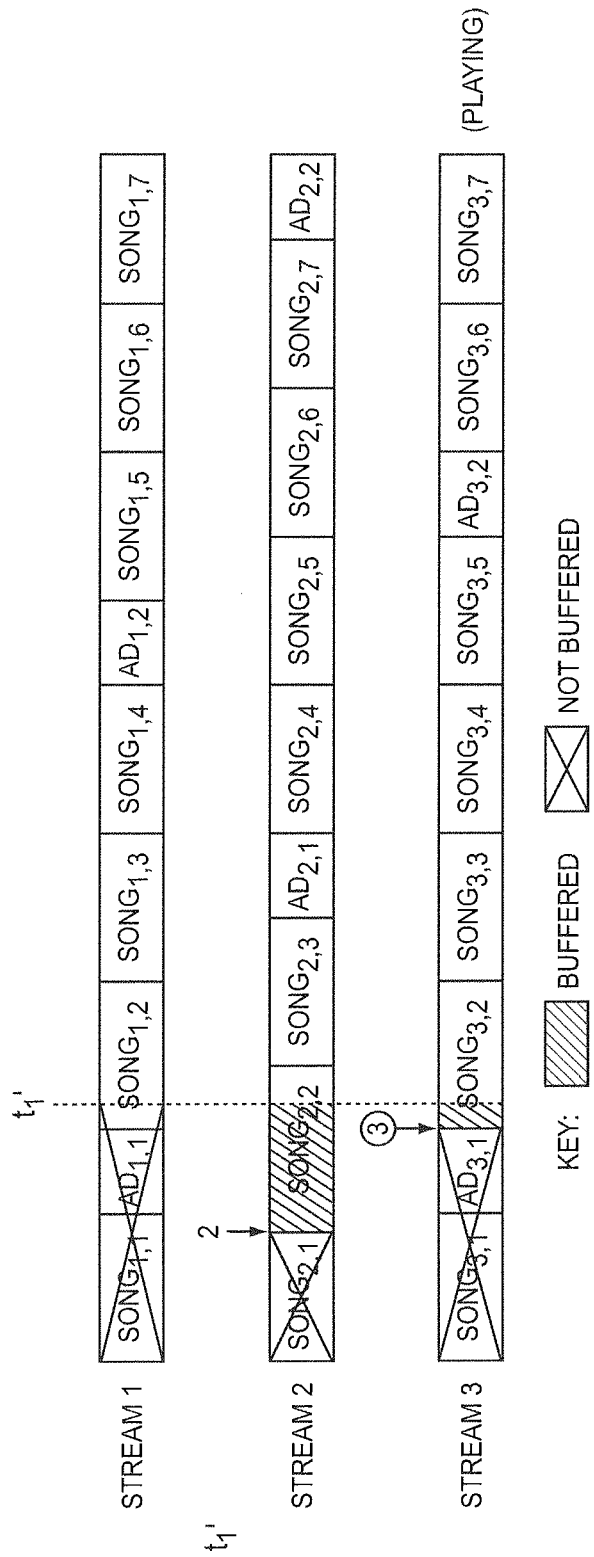
Figure 11A:
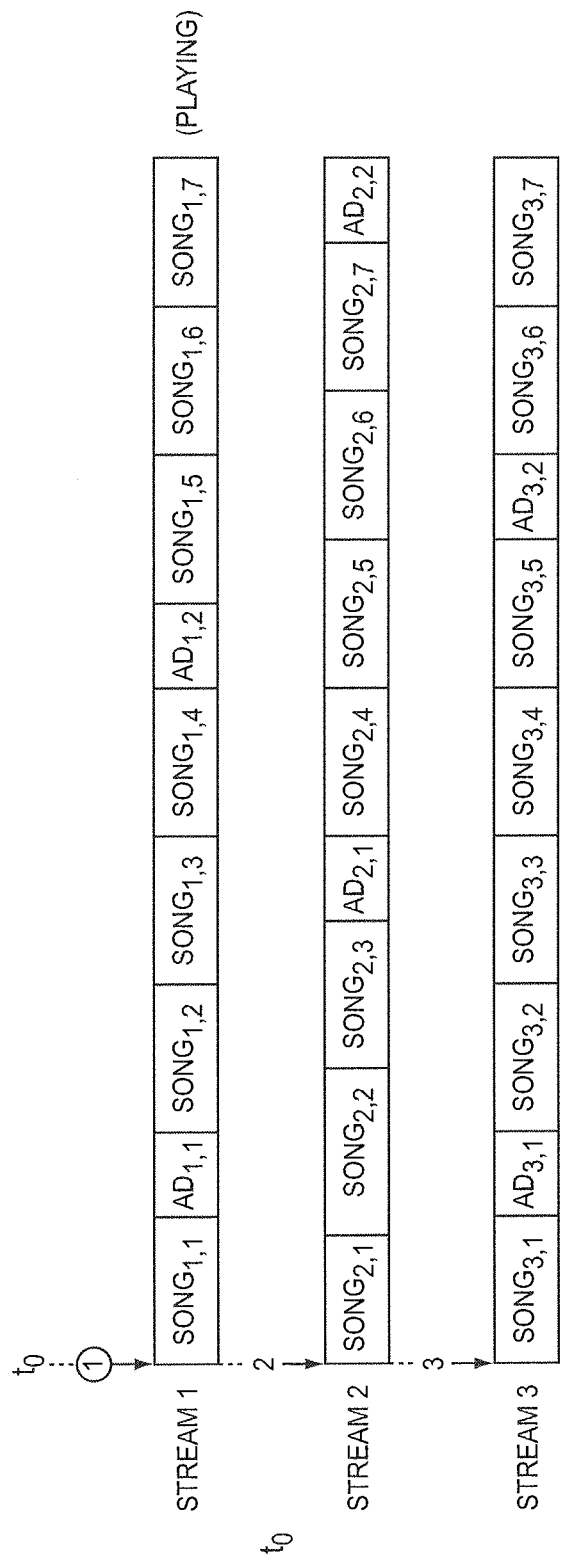
Figure 11C:
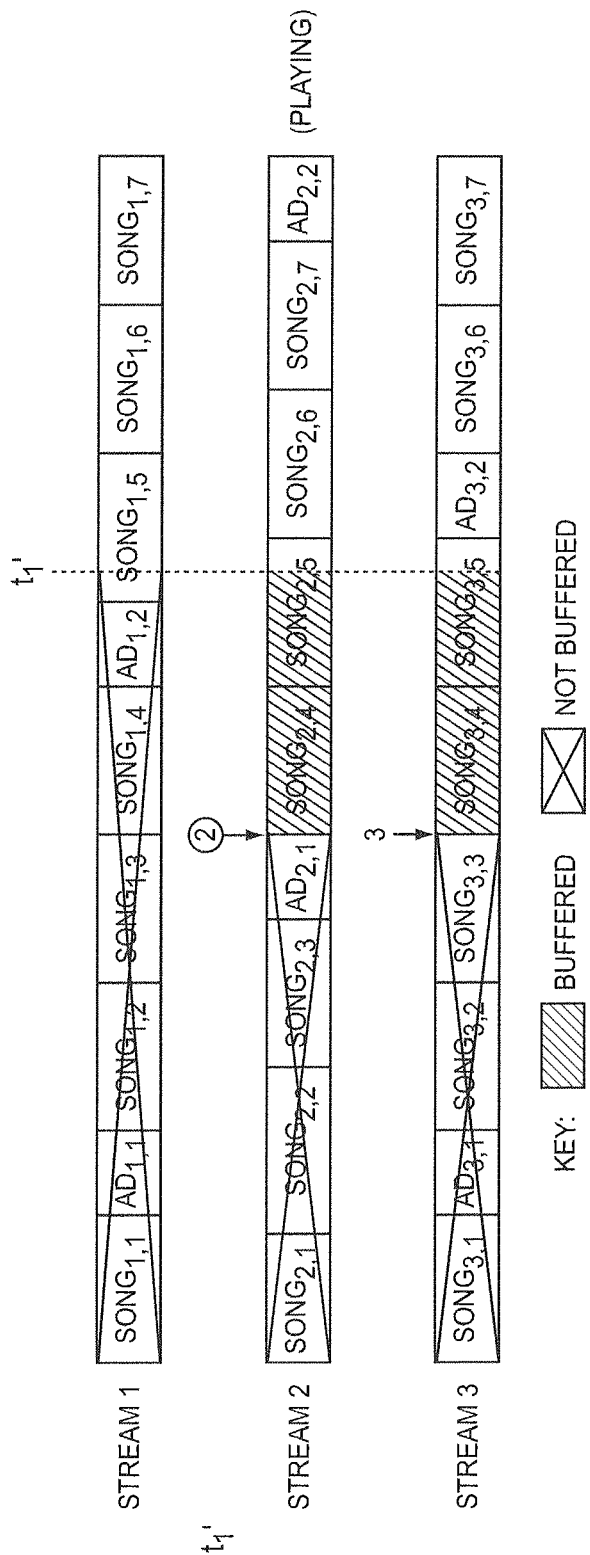
Figure 12A:
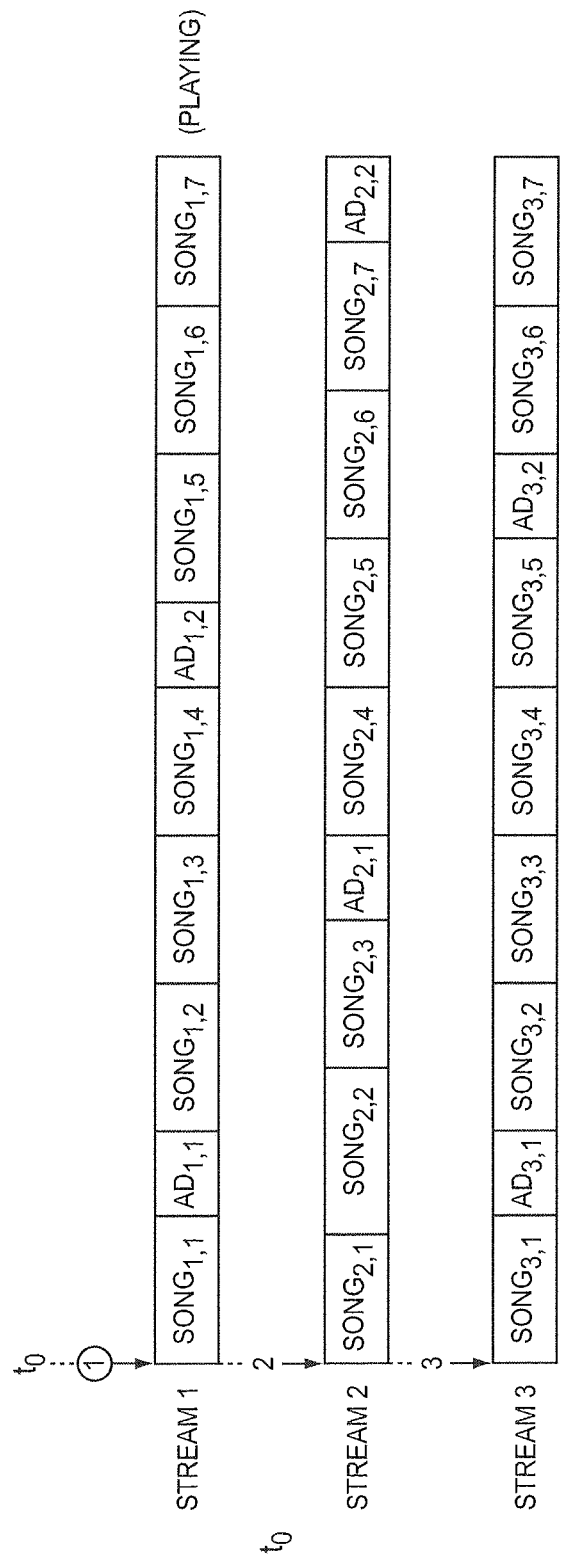
Figure 12B:
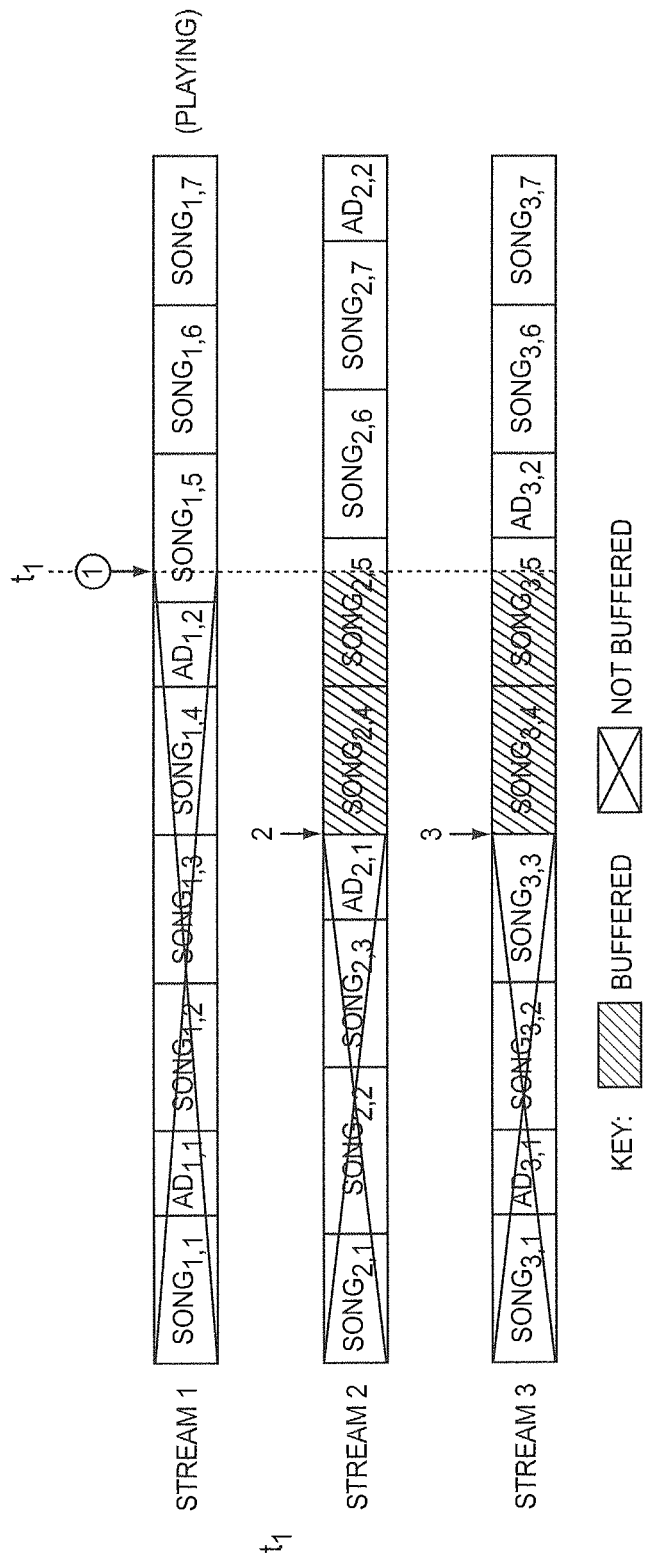
Figure 12C:
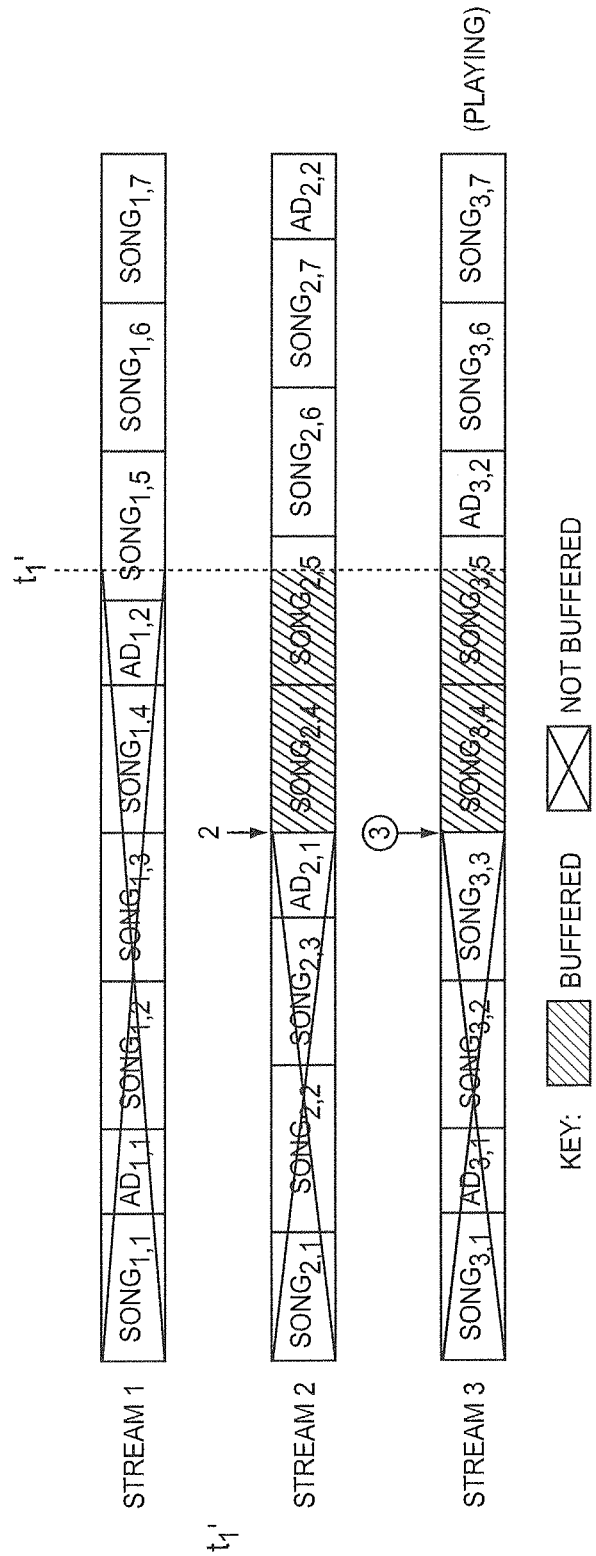

FIG. 1 illustrates a system in which a skip feature is implemented for a broadcast or multicast media station according to one embodiment of the present disclosure;

FIG. 2 graphically illustrates two exemplary content streams for a media station enabling a skip feature according to one embodiment of the present disclosure;

FIG. 3 is a block diagram of an exemplary embodiment of one of the receiving devices of FIG. 1;

FIGS. 4A-4H graphically illustrate the operation of the receiving device of FIG. 3 to provide a skip feature for a broadcast or multicast media station according to one embodiment of the present disclosure;

FIGS. 5A-5I graphically illustrate the operation of the receiving device of FIG. 3 to provide a skip feature for a broadcast or multicast media station according to another embodiment of the present disclosure;

FIG. 6 illustrates a system in which a skip feature is implemented for broadcast or multicast media content according to another embodiment of the present disclosure;

Figures 7A, 7B:
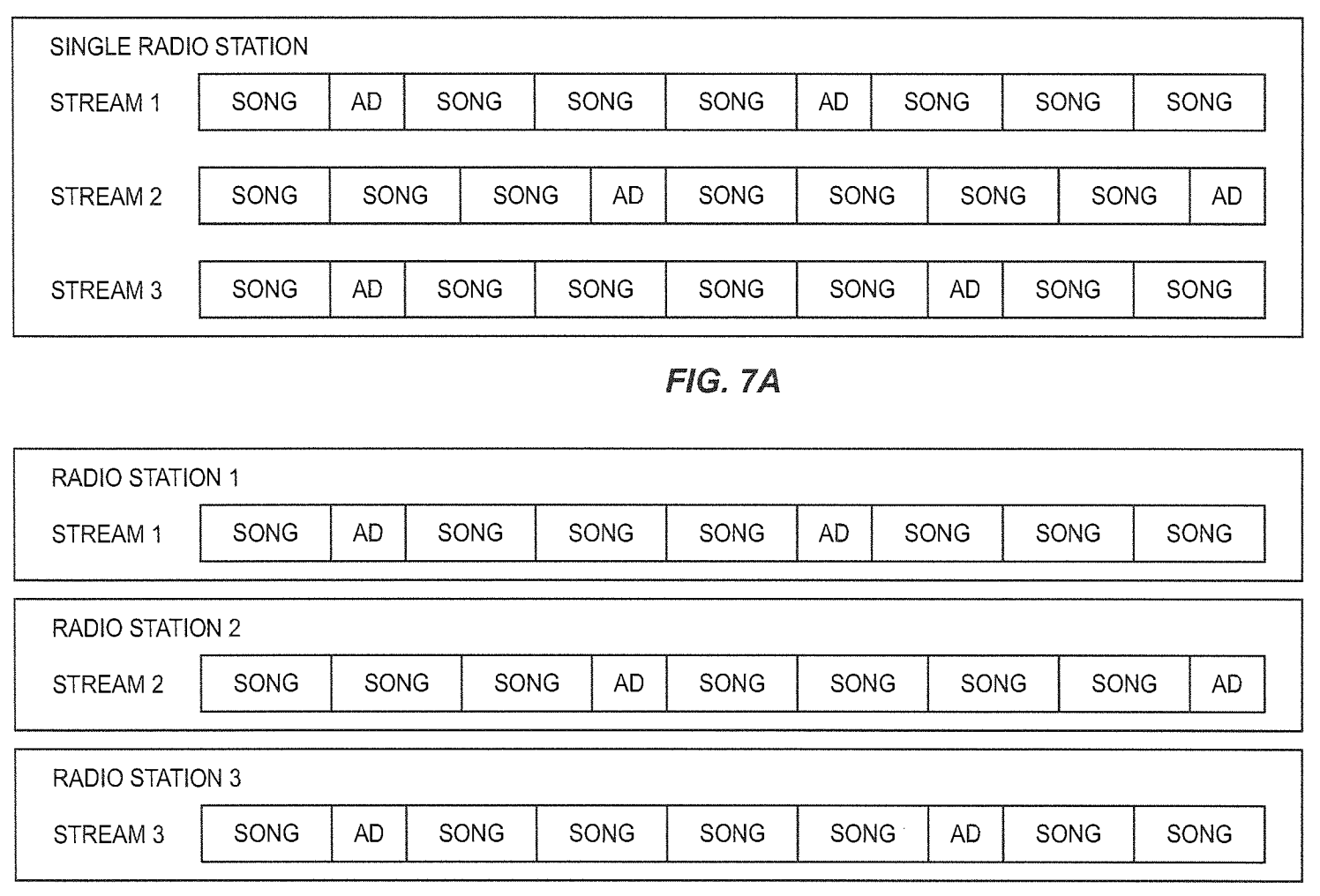

FIG. 7A graphically illustrates multiple exemplary content streams for a single media station enabling a skip feature according to one embodiment of the present disclosure;

FIG. 7B graphically illustrates multiple exemplary content streams from multiple media stations enabling a skip feature according to another embodiment of the present disclosure;

FIG. 8 is a block diagram of an exemplary embodiment of one of the receiving devices of FIG. 6;

FIGS. 9A-9I graphically illustrate the operation of the buffer management function of the receiving device of FIG. 8 according to one embodiment of the present disclosure;

FIGS. 10A-10C graphically illustrate the operation of the buffer management function of the receiving device of FIG. 8 according to another embodiment of the present disclosure;

FIGS. 11A-11C graphically illustrate the operation of the buffer management function of the receiving device of FIG. 8 according to another embodiment of the present disclosure; and FIGS. 12A-12C graphically illustrate the operation of the buffer management function of the receiving device of FIG. 8 according to another embodiment of the present disclosure.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a system 10 in which a skip feature is implemented for a broadcast or multicast media station according to one embodiment of the present disclosure. As used herein, a media station is preferably either a radio station (e.g., WCMC-HD 99.9 FM in Raleigh-Durham, N.C. or the like) or a television station (e.g., NBC, ABC, CBS, FOX, or the like). The system 10 includes a media station server 12 that operates to provide streaming content for a media station to a number of receiving devices 14-1 through 14-N$_1$ having associated users 16-1 through 16-N$_1$ via an Internet Protocol (IP) based infrastructure. In this embodiment, the IP based infrastructure includes a streaming IP server 18 and an IP based network 20. The IP based network 20 is preferably a global network such as the Internet. However, the present disclosure is not limited thereto.

In addition, the media station server 12 operates to provide the streaming content for the media station to a number of receiving devices 22-1 through 22-N$_2$ having associated users 24-1 through 24-N$_2$ via a terrestrial broadcast infrastructure. In this embodiment, the terrestrial broadcast infrastructure includes broadcasting towers 26 and 28. While two broadcasting towers 26 and 28 are illustrated in this embodiment, the terrestrial broadcast infrastructure may include any number of one or more broadcasting towers. Note that while both the receiving devices 14-1 through 14-N$_1$ and the receiving devices 22-1 through 22-N$_2$ are discussed herein, the media station server 12 may alternatively deliver the streaming content for the media station to only the receiving devices 14-1 through 14-N$_1$ via the IP based infrastructure or only the receiving devices 22-1 through 22-N$_2$ via the terrestrial broadcast infrastructure. Also, while not illustrated, the concepts discussed herein are also applicable to a satellite broadcast network such as, for example, satellite radio (e.g., XM/Sirius satellite radio).

The media station server 12 is a physical server that operates to transmit streaming media content for a media station according to a programming schedule generated by a programming function 30. More specifically, as discussed below, the media station server 12 transmits two different content streams for the media station in order to enable a skip function at the receiving devices 14-1 through 14-N$_1$ and 22-1 through 22-N$_2$. Notably, the two content streams each contain different media content for a single media station. The media station server 12 preferably transmits the two different content streams simultaneously. For example, the two different content streams may be transmitted at substantially the same time via separate sub-carrier frequencies of a single HD radio channel, transmitted at substantially the same time in different time slots of a single Time Division Multiplexing (TDM) channel, or the like. Further, the two different content streams may be transmitted by the media station server 12 using a traditional streaming protocol wherein the two different content streams are streamed in real-time. In another embodiment, the two different content streams may be streamed using progressive downloading. For progressive downloading, chunks of content for each of the two different content streams are progressively downloaded as needed. For example, if a ten second chunk of content can be downloaded in three seconds, then the media station server 12 may progressively download ten second chunks of the content for each of the two different content streams approximately every ten seconds. The remaining capacity of the transmission channel may be used for additional services.

The programming function 30 may be implemented in software, hardware, or a combination thereof. The programming function 30 operates to generate programming schedules for the two content streams. For each of the two content streams for the media station, the programming schedule includes a number of media items, which in this embodiment are from a content database 32. The content database 32 includes a number of media items or references to a number of media items that may be distributed on the media station. The media items may be audio items such as songs, news, and audio advertisements; video items such as television programs, movies, and video advertisements; or the like.

In the preferred embodiment, the programming function 30 operates to generate the programming schedules for the two content streams such that the media station complies with one or more rights management rules relating to the distribution of media content on the media station. The one or more rights management rules may be provided in one or more licenses granted for media content to be distributed on the media station. For instance, in an embodiment where the media station is a radio station, the programming function 30 may generate the programming schedules for the two content streams for the radio station to comply with the Digital Millennium Copyright Act (DMCA) in such a manner as to avoid payment of music-on-demand type fees or charges. Some key rules of the DMCA are summarized as follows:

- a radio station cannot perform sound recordings within one hour of a request by a listener or at a time designated by the listener;
- in any three hour period, a radio station cannot intentionally include more than three songs (and not more than two songs in a row) from the same recording and cannot include more than four songs (and no more than three songs in a row) from the same recording artist or anthology/box set;
- continuous looped programs on a radio station may not be less than three hours long;
- rebroadcasts of programs may be performed at scheduled times as follows:
  - programs of less than one hour: no more than three times in a two-week period; and
  - programs longer than one hour: no more than four times in any two-week period; and
- advance program guides or other means cannot be used to pre-announce when particular sound recordings will be played on a radio station.

When generating the programming schedules for the two content streams to comply with the one or more rights management rules, the programming function 30 may take into account possible skip events that may occur at the receiving devices 14-1 through 14-N$_1$ and 22-1 through 22-N$_2$. In addition or alternatively, the receiving devices 14-1 through 14-N$_1$ and 22-1 through 22-N$_2$ may perform a Digital Rights Management (DRM) function in order to ensure compliance with one or more rights management rules. For example, the receiving devices 14-1 through 14-N$_1$ and 22-1 through 22-N$_2$ may prevent a skip from one media item to another media item if the skip would violate the one or more rights management rules relating to delivery of media content on the media station. Note that these rights management rules may be downloaded from a remote source such as, but not limited to, the media station server 12.

The receiving devices 14-1 through 14-N$_1$ and 22-1 through 22-N$_2$ are generally any type of devices capable of receiving and processing the two content streams for the media station via the IP based infrastructure or the terrestrial broadcast infrastructure, respectively. For example, each of the receiving devices 14-1 through 14-N$_1$ may be a personal computer, a mobile smart phone having a cellular network connection to the IP based network 20, a portable media player having a local wireless connection (e.g., IEEE 802.11x) to the IP based network 20, a set-top box, or the like. Similarly, each of the receiving devices 22-1 through 22-N$_2$ may be, for example, an HD radio receiver, a mobile phone equipped with an HD receiver, a portable media player equipped with an HD receiver, or the like.

Using the receiving device 14-1 as an example for the receiving devices 14-1 through 14-N₁, the receiving device 14-1 generally operates to receive the two content streams simultaneously transmitted by the media station server 12 for the media station via the IP based infrastructure. More specifically, the streaming IP server 18 receives the two content streams for the media station from the media station server 12 and then transmits the two content streams for the media station over the IP based network 20 using a multicast channel. For example, the streaming IP server 18 may multicast the two content streams for the media station using a single Internet Protocol version 6 (IPv6) multicast channel (i.e., transmitted using a single IPv6 multicast IP address). Alternatively, a different multicast channel may be used for each of the two content streams for the media station. The receiving device 14-1 tunes to, or otherwise selects, the multicast channel for the media station and begins playback of one of the two content streams, which is referred to as a first content stream of the two content streams. The one of the two content streams selected as the first content stream for playback may be determined by the receiving device 14-1. For example, in order to allow the skip feature to be available in the shortest amount of time, the receiving device 14-1 may select the one of the two content streams with the greatest amount of time before starting a next media item as the first content stream.

In one embodiment, in addition to starting playback of the first content stream, the receiving device 14-1 begins buffering a most recent media item received on the other content stream, which is referred to as a second content stream or auxiliary content stream. During playback of the first content stream, the receiving device 14-1 continues to receive the second content stream and buffer the most recent media item received on the second content stream. Thus, as new media items are received on the second content stream, the most recent media item buffered by the receiving device 14-1 is updated. Note that the receiving device 14-1 may be enabled to detect the end of one media item and the start of a next media item in a content stream using any known technique. For example, the content streams may include markers or breaks that identify the start of each media item in the content stream. In addition, the markers or breaks may identify the playback lengths of the media items, the file sizes of the media items, or the like. When the user 16-1 initiates a skip, the receiving device 14-1 switches playback from the first content stream to the second content stream and begins playback of the second content stream at the start of the most recent media item received on the second content stream and buffered at the receiving device 14-1. In this manner, the receiving device 14-1 emulates a skip such that, to the user 16-1, it appears as though the user 16-1 has skipped ahead in playback of the media station to the next media item.

In another embodiment, in addition to starting playback of the first content stream, the receiving device 14-1 begins buffering one or more most recent media items received on the other content stream, which is referred to as a second content stream or auxiliary content stream. In this embodiment, rather than limiting buffering to one media item, buffering is limited to two or more media items. This buffering limit may be a predefined number of media items (e.g., at most two songs and one advertisement) or a maximum number of media items that can be stored in the buffer (i.e., a limit resulting from a size of the buffer). During playback of the first content stream, the receiving device 14-1 continues to receive the second content stream and buffer the one or more most recent media items received on the second content stream. Thus, as new media items are received on the second content stream, the one or more most recent media items buffered by the receiving device 14-1 are updated. When the user 16-1 initiates a skip, the receiving device 14-1 switches playback from the first content stream to the second content stream and begins playback of the second content stream at the start of the one or more most recent media items received on the second content stream and buffered at the receiving device 14-1.

Using the receiving device 22-1 as an example for the receiving devices 22-1 through 22-N₂, the receiving device 22-1 generally operates to receive the two content streams simultaneously transmitted by the media station server 12 for the media station via the terrestrial broadcast network. More specifically, the broadcasting towers 26 and 28 receive the two content streams for the media station from the media station server 12 and then broadcast the two content streams for the media station over the air. Preferably, the two content streams are broadcast over a single carrier frequency. For example, for HD radio, the two continent streams for a HD radio station are preferably simultaneously transmitted as sub-channels of a single HD radio frequency channel. More specifically, in one embodiment, for HD radio, a single carrier frequency can deliver 300 kilobits per second (kb/s), and the two content streams may each use 100 kb/s while leaving the additional 100 kb/s for additional audio or data services. The receiving device 22-1 tunes to, or otherwise selects, a broadcast channel for the media station and begins playback of one of the two content streams, which is referred to as a first content stream of the two content streams. The one of the two content streams selected as the first content stream for playback may be determined by the receiving device 22-1. For example, in order to allow the skip feature to be available in the shortest amount of time, the receiving device 22-1 may select the one of the two content streams with the greatest amount of time before starting a next media item as the first content stream.

In one embodiment, in addition to starting playback of the first content stream, the receiving device 22-1 begins buffering a most recent media item received on the other content stream, which is referred to as a second content stream or auxiliary content stream. During playback of the first content stream, the receiving device 22-1 continues to receive the second content stream and buffer the most recent media item received on the second content stream. Thus, as new media items are received on the second content stream, the most recent media item buffered by the receiving device 22-1 is updated. Note that the receiving device 22-1 may be enabled to detect the end of one media item and the start of a next media item in a content stream using any known technique. For example, the content streams may include markers or breaks that identify the start of each media item in the content stream. In addition, the markers or breaks may identify the playback lengths of the media items, the file sizes of the media items, or the like. When the user 24-1 initiates a skip, the receiving device 22-1 switches playback from the first content stream to the second content stream and begins playback of the second content stream at the start of the most recent media item received on the second content stream and buffered at the receiving device 22-1. In this manner, the receiving device 22-1 emulates a skip such that, to the user 24-1, it appears as though the user 24-1 has skipped ahead in playback of the media station to the next media item.

In another embodiment, in addition to starting playback of the first content stream, the receiving device 22-1 begins buffering one or more most recent media items received on the other content stream, which is referred to as a second content stream or auxiliary content stream. In this embodiment, rather than limiting buffering to one media item, buffering is limited to two or more media items. This buffering limit may be a predefined number of media items (e.g., at most two songs and one advertisement) or a maximum number of media items that can be stored in the buffer (i.e., a limit resulting from a size of the buffer). During playback of the first content stream, the receiving device 22-1 continues to receive the second content stream and buffer the one or more most recent media items received on the second content stream. Thus, as new media items are received on the second content stream, the one or more most recent media items buffered by the receiving device 22-1 are updated. When the user 24-1 initiates a skip, the receiving device 22-1 switches playback from the first content stream to the second content stream and begins playback of the second content stream at the start of the one or more most recent media items received on the second content stream and buffered at the receiving device 22-1.

FIG. 2 is a graphical illustration of two content streams (STREAM A and STREAM B) for a single media station, which in this example is a radio station. As illustrated, each of the two content streams includes a sequence of songs and audio advertisements. However, the present invention is not limited thereto. The two content streams are preferably transmitted over a single communication channel, such as a single HD radio carrier frequency or a single IP multicast address.

FIG. 3 is a block diagram of an exemplary receiving device 34 according to one embodiment of the present disclosure. In this embodiment, the media station provided by the media station server 12 (FIG. 1) is a radio station, and the receiving device 34 includes an HD radio receiver 36 for receiving content streams for media stations from the broadcasting towers 26 and 28 (FIG. 1) of the terrestrial broadcast infrastructure. The HD radio receiver 36 is implemented in hardware. In addition, the receiving device 34 includes a network interface 38 for receiving content streams for media stations from the streaming IP server 18 via the IP based network 20 (FIG. 1). The network interface 38 is implemented in hardware and may be a wired or wireless network interface to the IP based network 20. The HD radio receiver 36 and the network interface 38 are controlled by a station select signal in order to tune to, or otherwise select, a desired media station. Preferably, the station select signal is controlled by a user of the receiving device 34 via a user interface of or associated with the receiving device 34.

For this discussion, the HD radio receiver 36 and the network interface 38 are tuned to the media station provided by the media station server 12. The HD radio receiver 36 operates to receive the two content streams (STREAM A and STREAM B) for the media station from the broadcasting towers 26 and 28 and output the content stream STREAM A to switch 40 and the content stream STREAM B to switch 42. In a similar manner, the network interface 38 operates to receive the two content streams (STREAM A and STREAM B) for the media station from the streaming IP server 18 via the IP based network 20 and output the content stream STREAM A to the switch 40 and the content stream STREAM B to the switch 42. The switches 40 and 42 are controlled via a source select signal to configure the receiving device 34 in either an HD radio mode of operation wherein the two content streams STREAM A and STREAM B from the HD radio receiver 36 are output by the switches 40 and 42, respectively, or an IP radio mode of operation wherein the two content streams STREAM A and STREAM B from the network interface 38 are output by the switches 40 and 42, respectively. When in the IP radio mode, the receiving device 34 operates as one of the receiving devices 14-1 through 14-N$_1$ of FIG. 1. When in the HD radio mode, the receiving device 34 operates as one of the receiving devices 22-1 through 22-N$_2$ of FIG. 1.

The content stream STREAM A output by the switch 40 is buffered by a stream A buffer 44. Likewise, the content stream STREAM B output by the switch 42 is buffered by a stream B buffer 46. The stream A and stream B buffers 44 and 46 may be implemented in memory such as, for example, Random Access Memory (RAM). The outputs of the stream A and stream B buffers 44 and 46 are provided to a switch 48. The switch 48 is controlled by a stream A/stream B select signal. In one embodiment, the stream A/stream B select signal is controlled by a user interface of or associated with the receiving device 34 such that the stream A/stream B select signal switches states when the user of the receiving device 34 selects a skip input (e.g., a skip button).

The output of the switch 48, whether the output is the buffered content stream STREAM A from the stream A buffer 44 or the buffered content stream STREAM B from the stream B buffer 46, is processed by a Coding-Decoding (CODEC) and playback function 50 and a resulting output signal is presented, or rendered, to the user of the receiving device 34 via one or more output devices 52. For example, if the media station is a radio station, the one or more output devices 52 may include one or more speakers, and the output signal of the CODEC and playback function 50 is one or more analog signals that drive the one or more speakers. The receiving device 34 also includes a buffer management function 54 which operates to control the stream A and stream B buffers 44 and 46 based on the stream A/stream B select signal to enable a skip function as described below. Note that the buffer management function 54 may also control the rate at which content is clocked out of the buffers 44 and 46. For example, in some situations, the buffer management function 54 may slightly increase or decrease the rate at which content is clocked out of the stream A buffer 44 (or the stream B buffer 46) to slightly increase or decrease the speed of playback of the content stream STREAM A (or the content stream STREAM B).

The components of the receiving device 34 illustrated in FIG. 3 may be implemented in hardware or a combination of hardware and software. For example, in one embodiment, the HD radio receiver 36 and the network interface 38 are implemented in hardware, and the switches 40, 42, and 48, the buffer management function 54, the CODEC and playback function 50, and possibly the buffers 44 and 46 may be implemented in one or more integrated circuits such as one or more Application Specific Integrated Circuits (ASICs), one or more Field Programmable Gate Arrays (FPGAs), or the like. As another example, in another embodiment, the HD radio receiver 36 and the network interface 38 are implemented in hardware, and the switches 40, 42, and 48, the buffer management function 54, the CODEC and playback function 50, and possibly the buffers 44 and 46 may be implemented in software executed by a computing device (e.g., a processor) having associated memory (e.g., RAM). Other variations of how the components of the receiving device 34 may be implemented in hardware or a combination of hardware and software will be apparent to one of ordinary skill in the art upon reading this disclosure and are to be included within the scope of this disclosure.

Figure 4A:
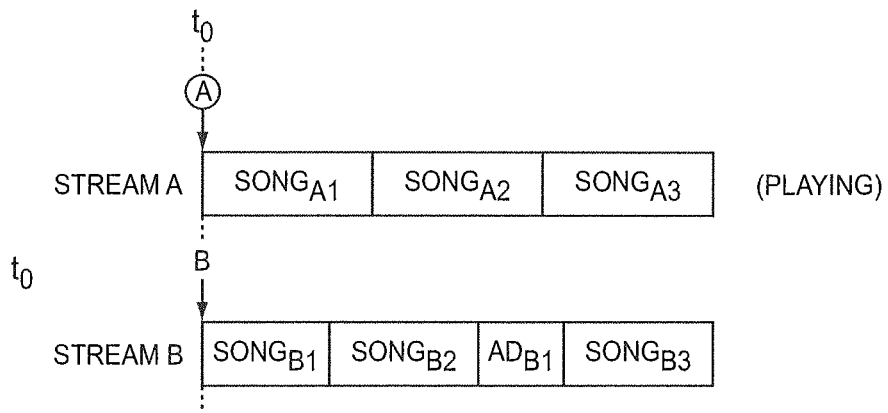

FIGS. 4A through 4H graphically illustrate the operation of the buffer management function 54 and a skip function according to one embodiment of the present disclosure. FIG. 4A illustrates a portion of the two streams STREAM A and STREAM B for the media station according to an exemplary embodiment of this disclosure. In this example, upon tuning to the media station, the receiving device 34 may initially buffer an initial amount of both STREAM A and STREAM B in order to provide smooth and continuous playback in a manner similar to that which is done for traditional streaming content. For this discussion, however, this initial buffering is ignored for clarity and ease of discussion. FIG. 4A illustrates a location of the output of the stream A buffer 44 (A) within STREAM A and a location of the output of the stream B buffer 46 (B) within STREAM B upon initially tuning to the media station and starting playback of STREAM A.

Figure 4B:
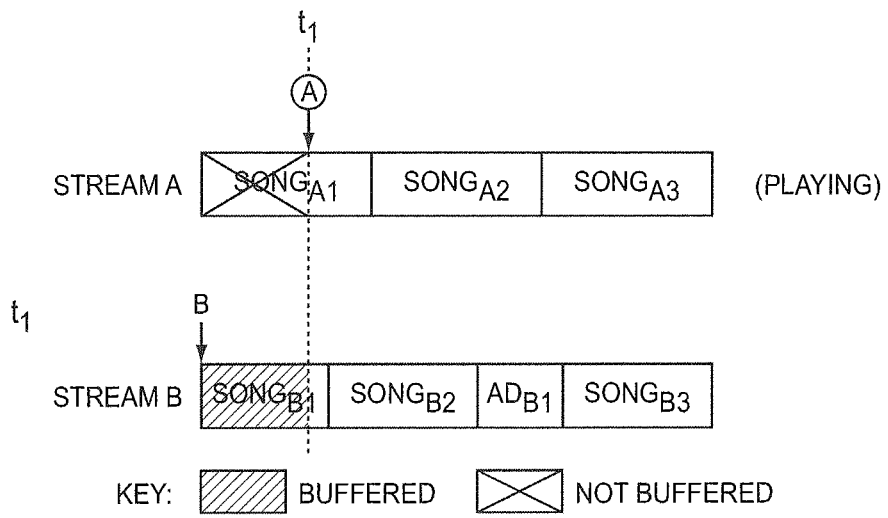

FIG. 4B illustrates the location of the output of the stream A buffer 44 (A) within STREAM A and the location of the output of the stream B buffer 46 (B) within STREAM B after playback of STREAM A from time $t_0$ to time $t_1$. During this time, a portion of $SONG_{A1}$ has been streamed to and played by the receiving device 34. While $SONG_{A1}$ from STREAM A has been playing, a portion of $SONG_{B1}$ is received by the receiving device 34 and stored in the stream B buffer 46. Note that the location of the output of the stream B buffer 46 (B) remains at the start of $SONG_{B1}$, which is the most recent song streamed on STREAM B.

Figure 4C:
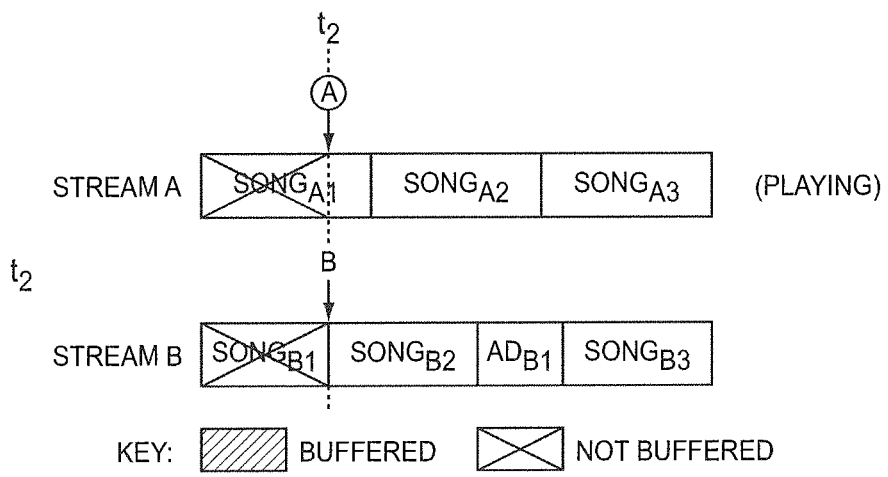

FIG. 4C illustrates the location of the output of the stream A buffer 44 (A) within STREAM A and the location of the output of the stream B buffer 46 (B) within STREAM B after playback of STREAM A continues from time $t_1$ to time $t_2$. At time $t_2$, $SONG_{B1}$ in STREAM B has completed, and $SONG_{B2}$ in STREAM B begins. In this embodiment, only the most recent song played in the auxiliary stream, which at this point is STREAM B, is buffered. As such, the location of the output of the stream B buffer 46 is set to the start of $SONG_{B2}$. Note that $SONG_{B1}$, which was previously stored in the stream B buffer 46, has been removed from the stream B buffer 46 in this embodiment. Also, due to the initial buffering of both STREAM A and STREAM B before starting playback, there is preferably a sufficient amount of $SONG_{B2}$ already buffered to enable a smooth transition to playback of $SONG_{B2}$ at time $t_2$ if the user of the receiving device 34 were to initiate a skip.

Figure 4D:
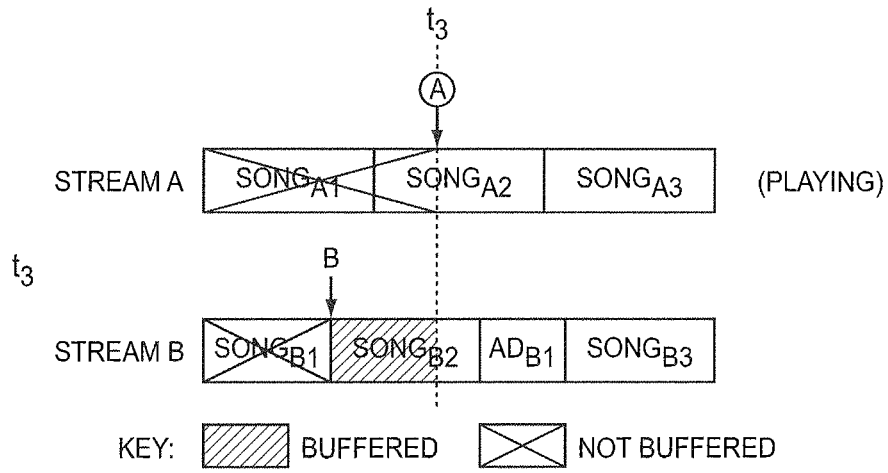

FIG. 4D illustrates the location of the output of the stream A buffer 44 (A) within STREAM A and the location of the output of the stream B buffer 46 (B) within STREAM B at time $t_3$. During the time from time $t_2$ to time $t_3$, playback of $SONG_{A1}$ has completed and playback of $SONG_{A2}$ in STREAM A has begun. During this time, a portion of $SONG_{B2}$ is received by the receiving device 34 in STREAM B and stored in the stream B buffer 46. Note that the location of the output of the stream B buffer 46 (B) remains at the start of $SONG_{B2}$, which is now the most recent song streamed on STREAM B.

Figure 4E:
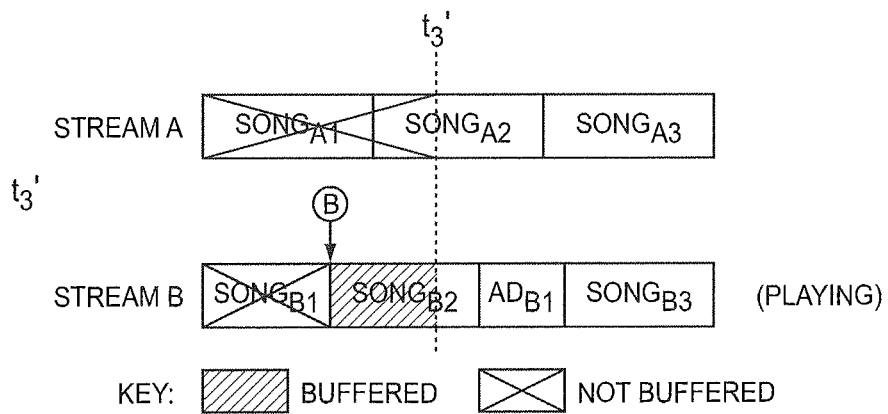

At time $t_3$, the user of the receiving device 34 makes a skip request. In response, the switch 48 (FIG. 3) begins to output the buffered STREAM B from the stream B buffer 46 to begin playback of STREAM B. As illustrated in FIG. 4E, because the location of the output of the stream B buffer 46 (B) has been maintained at the start of the most recent song streamed on STREAM B, which in this example is $SONG_{B2}$, playback of STREAM B begins at the start of $SONG_{B2}$. By switching playback from STREAM A to STREAM B beginning at the start of $SONG_{B2}$, the receiving device 34 emulates a skip request. In other words, playback substantially immediately switches from $SONG_{A2}$ in STREAM A to the start of playback of $SONG_{B2}$ in STREAM B, thereby emulating a skip feature. To the user of the receiving device 34, it appears as though the user has been enabled to skip ahead in the programming of the radio station. In this embodiment, once playback switches to STREAM B, any remaining portion of the song from which the user skipped, which in this example is $SONG_{A2}$, is no longer buffered in the stream A buffer 44. As such, the skip feature is disabled until the start of the next media item (e.g., song or ad) on STREAM A. Note that an indicator may be presented to the user of the receiving device 34 to notify the user when the skip feature is disabled, when the skip feature is enabled, or both.

Figure 4F:
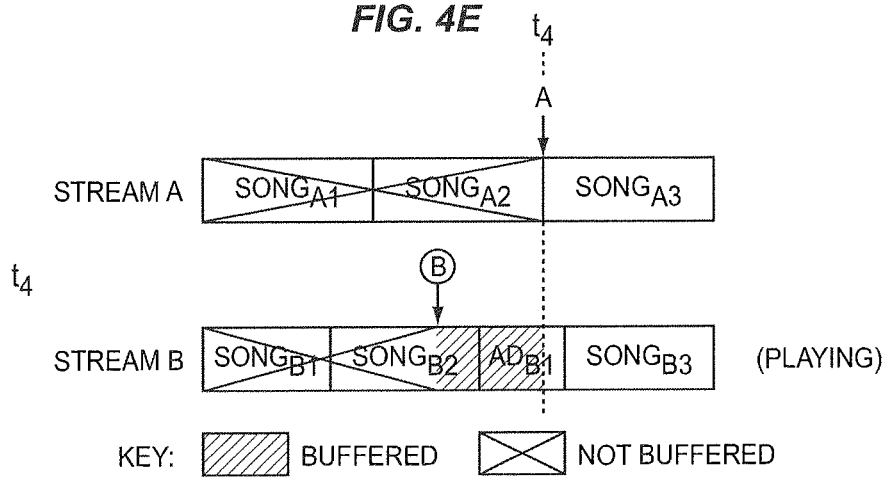
Figure 4G:
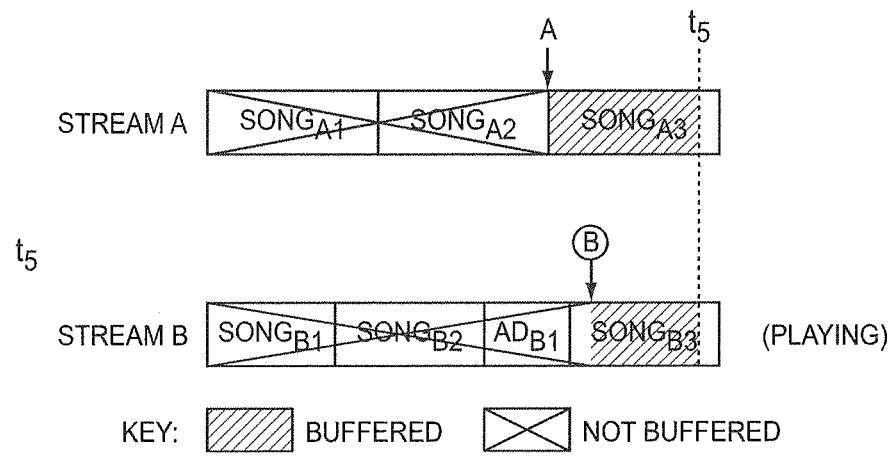
Figure 4H:
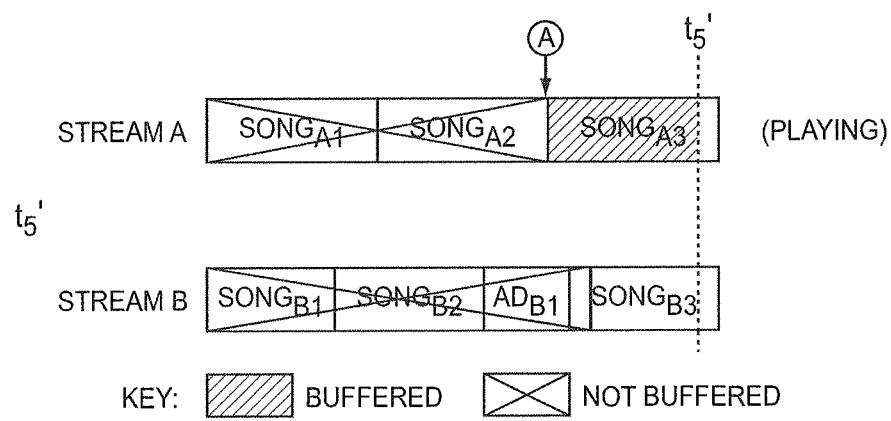

FIG. 4F illustrates the location of the output of the stream A buffer 44 (A) and the location of the output of the stream B buffer 46 (B) at time $t_4$. At time $t_4$, STREAM A has reached the end of $SONG_{A2}$ and the start of the next song, which is $SONG_{A3}$. As such, the location of the output of the stream A buffer 44 (A) is set to the start of $SONG_{A3}$ and the skip feature is again enabled. FIG. 4G illustrates the location of the output of the stream A buffer 44 (A) and the location of the output of the stream B buffer 46 (B) at time $t_5$. At time $t_5$, playback of STREAM B has continued, and the output of the stream A buffer 44 (A) remains at the start of $SONG_{A3}$. At time $t_5$, during playback of $SONG_{B3}$ in STREAM B, the user of the receiving device 34 makes another skip request. In response, as illustrated in FIG. 4H, playback switches from STREAM B to STREAM A beginning at the start of the most recent song on STREAM A, which in this case is $SONG_{A3}$. In this embodiment, the skip feature is now disabled until the start of the next media item (e.g., song or ad) in STREAM B. From this point, playback continues in the manner described above to enable the user of the receiving device 34 to continue playback of the radio station and make skip requests.

FIGS. 5A through 5I graphically illustrate the operation of the buffer management function 54 and a skip function according to another embodiment of the present disclosure. In this embodiment, rather than buffering a single most recent media item of the auxiliary stream (i.e., the content stream not currently being played), more than one most recent media item of the auxiliary stream are buffered. Specifically, in this example, at most two most recent media items of the auxiliary stream are buffered.

Figure 5A:
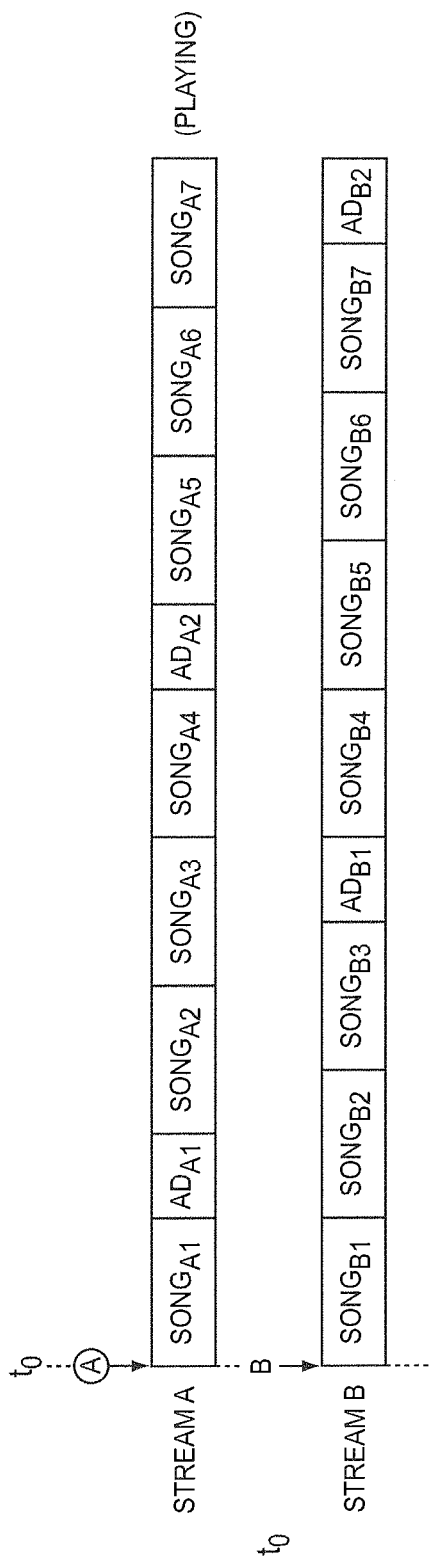

FIG. 5A illustrates a portion of the two streams STREAM A and STREAM B for the media station according to an exemplary embodiment of the present disclosure. In this example, upon tuning to the media station, the receiving device 34 may initially buffer an initial amount of both STREAM A and STREAM B. For this discussion, however, this initial buffering is ignored for clarity and ease of discussion. FIG. 5A illustrates a location of the output of the stream A buffer 44 (A) within STREAM A and a location of the output of the stream B buffer 46 (B) within STREAM B upon initially tuning to the media station and starting playback of STREAM A.

Figure 5B:
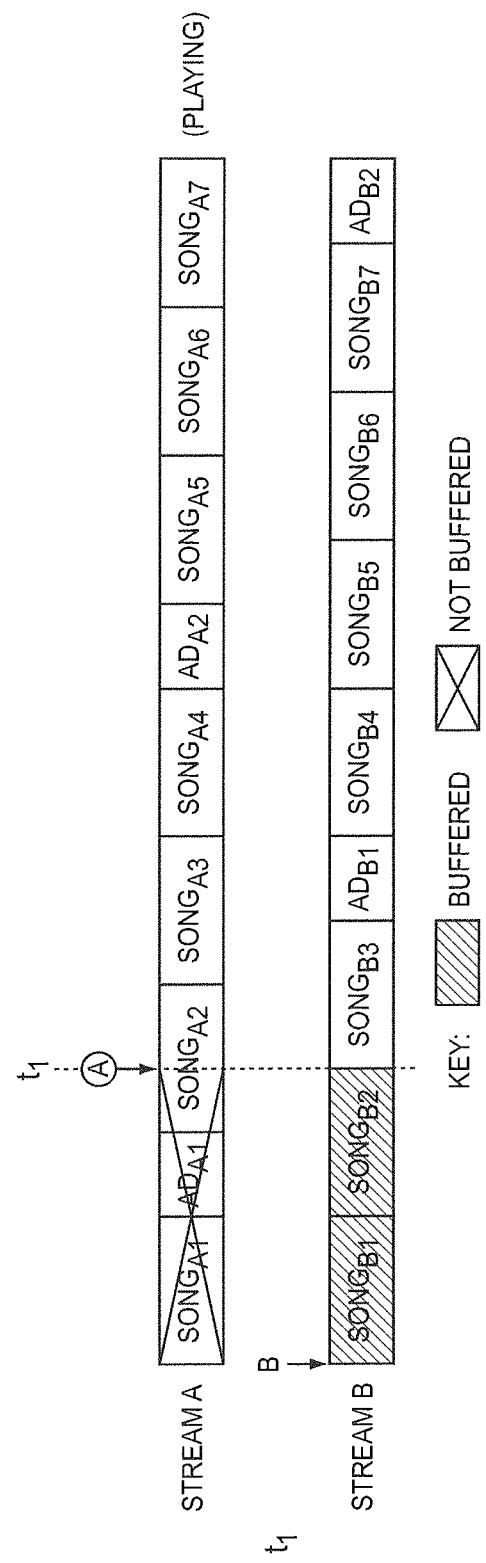

FIG. 5B illustrates the location of the output of the stream A buffer 44 (A) within STREAM A and the location of the output of the stream B buffer 46 (B) within STREAM B after playback of STREAM A from time $t_0$ to time $t_1$. During this time, $SONG_{A1}$, $AD_{A1}$, and a portion of $SONG_{A2}$ have been streamed to and played by the receiving device 34. At the same time, $SONG_{B1}$ and $SONG_{B2}$ in STREAM B have been streamed to the receiving device 34 and stored in the stream B buffer 46. SONG$_{B1}$ and SONG$_{B2}$ are the two most recent songs received in STREAM B and are therefore buffered. Note that the location of the output of the stream B buffer 46 (B) remains at the start of SONG$_{B1}$.

FIG. 5C illustrates the location of the output of the stream A buffer 44 (A) within STREAM A and the location of the output of the stream B buffer 46 (B) within STREAM B after playback of STREAM A from time $t_1$ to time $t_2$. In this embodiment, either the size of the stream B buffer 46 limits buffering to two songs or the buffer management function 54 limits buffering to two songs. As such, once SONG$_{B3}$ begins on STREAM B, SONG$_{B2}$ and SONG$_{B3}$ are the two most recent songs received on STREAM B. As such, the buffer management function 54 sets the location of the output of the stream B buffer 46 (B) to the start of SONG$_{B2}$ such that SONG$_{B2}$ and SONG$_{B3}$ are now the two most recent songs of STREAM B being buffered in the stream B buffer 46. Further, in this embodiment, SONG$_{B1}$ is removed from the stream B buffer 46.

At time $t_2$, the receiving device 34 receives a skip request from the user. In response, as illustrated in FIG. 5D, the receiving device 34 switches playback from STREAM A to STREAM B beginning at the start of the first of the two most recent songs stored in the stream B buffer 46, which in this example is SONG$_{B2}$. As illustrated in FIG. 5E, from time $t_2$ to time $t_3$, playback of SONG$_{B2}$ continues. In this example, after playback of a portion of SONG$_{B2}$, the receiving device 34 receives another skip request from the user. In response, as illustrated in FIG. 5F, since the next song in STREAM B (SONG$_{B3}$) is buffered in the stream B buffer 46, the receiving device 34 skips ahead to SONG$_{B3}$ in STREAM B by setting the location of the output of the stream B buffer 46 (B) to the start of SONG$_{B3}$.

Figure 5I:
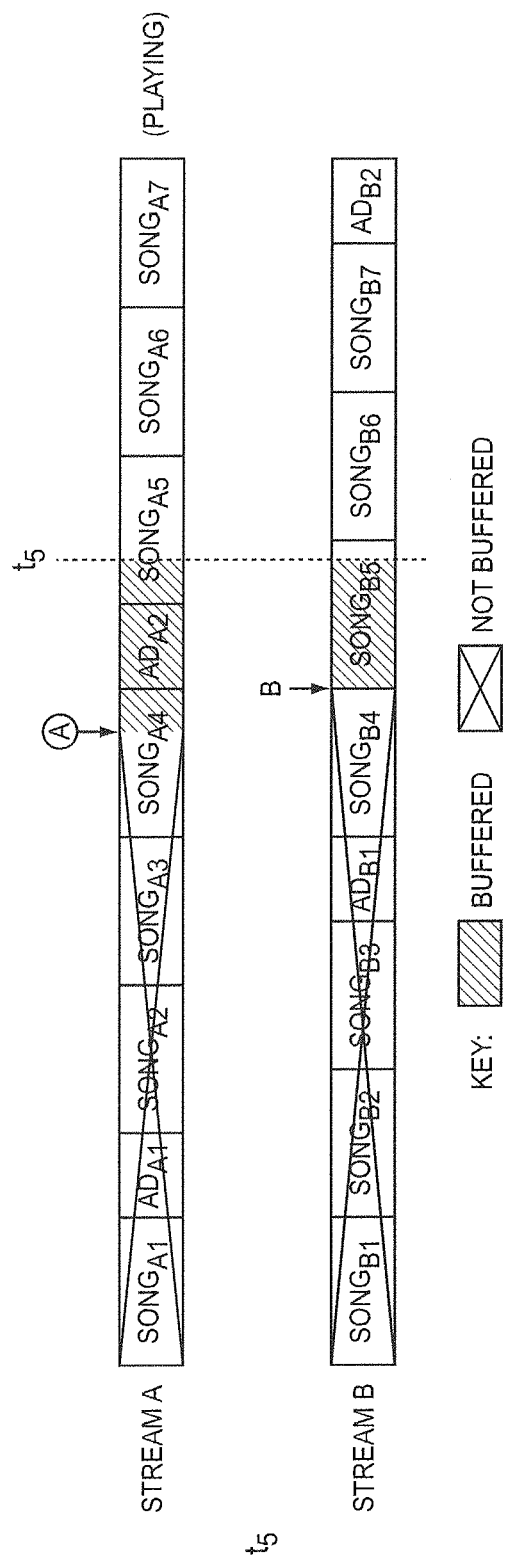

As illustrated in FIG. 5G, playback of STREAM B continues from time $t_3$ to time $t_4$. Note that sometime between time $t_3$ and time $t_4$, the end of SONG$_{A3}$ (i.e., the song from which the user initially skipped ahead) and the beginning of SONG$_{A4}$ occurs. At that point, the location of the output of the stream A buffer 44 (A) is set to the start of SONG$_{A4}$ and buffering of SONG$_{A4}$ begins. At time $t_4$, the receiving device 34 receives another skip request from the user. In response, as illustrated in FIG. 5H, since buffering of the next song in STREAM B has not yet begun, the receiving device 34 switches playback from STREAM B to STREAM A beginning at the start of SONG$_{A4}$. Lastly, FIG. 5I illustrates that buffering of STREAM B again resumes at the start of the next media item in STREAM B, which in this example is SONG$_{B5}$. From this point, playback of the radio station continues in a similar manner.

It should be noted that while the discussion herein focuses on the use of two content streams to provide a skip function for a media station, the present disclosure is not limited thereto. For example, multiple content streams (i.e., more than two content streams) for a single media station or multiple media stations may be used to provide a skip function. More specifically, a receiving device simultaneously receives the multiple content streams transmitted for one or more media stations. The receiving device provides a skip function by buffering the multiple content streams and systematically switching playback among the multiple content streams in a manner similar to that described above for two content streams.

FIG. 6 illustrates the system 10 according to another embodiment of the present disclosure in which two or more content streams from one or more media stations are used to provide a skip function. In this embodiment, the system 10 is substantially the same as that described above with respect to FIG. 1. However, in this embodiment, the system 10 includes one or more media station servers 12 operating to provide media content streams for corresponding media stations. As described below in detail, in one embodiment, the system 10 includes a single media station sever 12 that operates to provide two or more content streams for a single media station. In another embodiment, the system 10 includes two or more media station servers 12 that operate to provide two or more content streams for two or more corresponding media stations, where each media station server 12 operates to provide a single content stream for a single corresponding media station.

FIG. 7A is a graphical illustration of multiple content streams (STREAM 1, STREAM 2, and STREAM 3) for a single media station, which in this embodiment is a single radio station. Note that while three content streams are illustrated in this example, there may be more than three content streams. As illustrated, each of the content streams includes a sequence of songs and audio advertisements. However, the present disclosure is not limited thereto. The content streams are preferably transmitted over a single communication channel, such as a single HD radio carrier frequency or a single IP multicast address.

FIG. 7B is a graphical illustration of multiple content streams (STREAM 1, STREAM 2, and STREAM 3) for multiple media stations, which in this embodiment are radio stations. Note that while three content streams are illustrated in this example, there may be any number of two or more content streams. Further, in this example, each content stream is for a different radio station. As illustrated, each of the content streams includes a sequence of songs and audio advertisements. However, the present disclosure is not limited thereto. The content streams are preferably transmitted over different communication channels allocated for the different radio stations, such as different HD radio carrier frequencies or different IP multicast addresses.

FIG. 8 is a block diagram of an exemplary receiving device 56 for use in the system 10 of FIG. 6 according to one embodiment of the present disclosure. As discussed below, the receiving device 56 may be configured in an IP radio mode of operation in which case the receiving device 56 corresponds to one of the receiving devices 14-1 through 14-N$_1$ of FIG. 6 or an HD radio mode of operation in which case the receiving device 56 corresponds to one of the receiving devices 22-1 through 22-N$_2$ of FIG. 6. In this embodiment, the one or more media stations provided by the one or more media station servers 12 (FIG. 6) are radio stations, and the receiving device 56 includes an HD radio receiver 58 for receiving content streams for media stations from the broadcasting towers 26 and 28 (FIG. 6) of the terrestrial broadcast infrastructure. The HD radio receiver 58 is implemented in hardware. In addition, the receiving device 56 includes a network interface 60 for receiving content streams for media stations from the streaming IP server 18 via the IP based network 20 (FIG. 6). The network interface 60 is implemented in hardware and may be a wired or wireless network interface to the IP based network 20. The HD radio receiver 58 and the network interface 60 are controlled by a station select signal in order to tune to, or otherwise select, a desired media station. In one embodiment, the station select signal is controlled by a user of the receiving device 56 via a user interface of or associated with the receiving device 56. In another embodiment, the station select signal is programmatically controlled by a controller of the receiving device 56 (e.g., buffer management function 72).

In one embodiment, the receiving device 56 receives multiple content streams (STREAM 1 through STREAM M) for a single media station. In this case, the HD radio receiver 58 operates to receive the multiple content streams (STREAM 1 through STREAM M) for the media station from the broadcasting towers 26 and 28 and output the content streams STREAM 1 through STREAM M to corresponding switches 62-1 through 62-M. In a similar manner, the network interface 60 operates to receive the content streams (STREAM 1 through STREAM M) for the media station from the streaming IP server 18 via the IP based network 20 and output the content streams STREAM 1 through STREAM M to the corresponding switches 62-1 through 62-M. The switches 62-1 through 62-M are controlled via a source select signal to configure the receiving device 56 in either an HD radio mode of operation wherein the content streams STREAM 1 through STREAM M from the HD radio receiver 58 are output by the switches 62-1 through 62-M, respectively, or an IP radio mode of operation wherein the content streams STREAM 1 through STREAM M from the network interface 60 are output by the switches 62-1 through 62-M, respectively. When in the IP radio mode, the receiving device 56 operates as one of the receiving devices 14-1 through 14-$N_1$ of FIG. 6. When in the HD radio mode, the receiving device 56 operates as one of the receiving devices 22-1 through 22-$N_2$ of FIG. 6.

The content stream STREAM 1 output by the switch 62-1 is buffered by a buffer 64-1 (also referred to herein as STREAM 1 buffer 62-1). Likewise, the content streams STREAM 2 through STREAM M output by the switches 62-2 through 62-M are buffered by corresponding buffers 64-2 through 64-M (also referred to herein as STREAM 2 through STREAM M buffers 64-2 through 64-M). The buffers 64-1 through 64-M may be implemented in memory such as, for example, RAM. The outputs of the buffers 64-1 through 64-M are provided to a switch 66. The switch 66 is controlled by a stream select signal. In this embodiment, the stream select signal is provided by a buffer management function 72. However, in one embodiment, the stream select signal is controlled by a user interface of or associated with the receiving device 56 such that the stream select signal sequentially steps through M states corresponding to the M content streams as the user of the receiving device 56 selects a skip input (e.g., a skip button).

The output of the switch 66 is processed by a CODEC and playback function 68 and a resulting output signal is presented, or rendered, to the user of the receiving device 56 via one or more output devices 70. For example, if the media station is a radio station, the one or more output devices 70 may include one or more speakers, and the output signal of the CODEC and playback function 68 is one or more analog signals that drive the one or more speakers.

The receiving device 56 also includes a buffer management function 72 which operates to control the buffers 64-1 through 64-M and, in this embodiment, the switch 66 based on a skip request input as described below. The skip request input is preferably asserted when the user of the receiving device 56 initiates the skip function by, for example, pressing a skip button on a user interface of the receiving device 56. Note that the buffer management function 72 may also control the rate at which content is clocked out of the buffers 64-1 through 64-M. For example, in some situations, the buffer management function 72 may slightly increase or decrease the rate at which content is clocked out of the buffer 64-1 to slightly increase or decrease the speed of playback of the content stream STREAM 1. For its operation, the buffer management function 72 preferably receives buffer status information from the buffers 64-1 through 64-M. In addition, the buffer management function 72 receives metadata for the songs received in the content streams. In one embodiment, the metadata for the songs is included in the content streams and is received by the buffer management function 72 from the buffers 64-1 through 64-M.

The components of the receiving device 56 illustrated in FIG. 8 may be implemented in hardware or a combination of hardware and software. For example, in one embodiment, the HD radio receiver 58 and the network interface 60 are implemented in hardware, and the switches 62-1 through 62-M and 66, the buffer management function 72, the CODEC and playback function 68, and possibly the buffers 64-1 through 64-M may be implemented in one or more integrated circuits such as one or more ASICs, one or more FPGAs, or the like. As another example, in another embodiment, the HD radio receiver 58 and the network interface 60 are implemented in hardware, and the switches 62-1 through 62-M and 66, the buffer management function 72, the CODEC and playback function 68, and possibly the buffers 64-1 through 64-M may be implemented in software executed by a computing device (e.g., a processor) having associated memory (e.g., RAM). Other variations of how the components of the receiving device 56 may be implemented in hardware or a combination of hardware and software will be apparent to one of ordinary skill in the art upon reading this disclosure and are to be included within the scope of this disclosure.

Figure 9A:
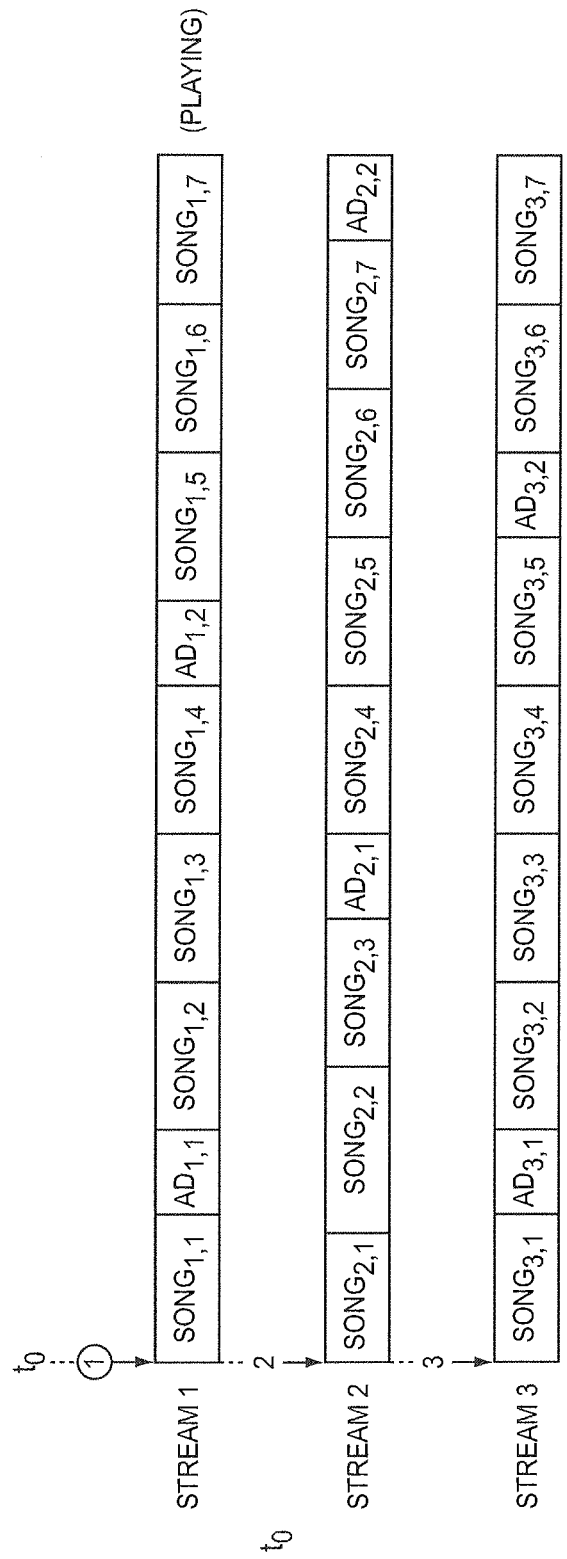

FIGS. 9A through 9I graphically illustrate the operation of the buffer management function 72 of FIG. 8 to provide a skip function according to one embodiment of the present disclosure. FIG. 9A illustrates multiple streams STREAM 1 through STREAM 3 simultaneously received by the receiving device 56 of FIG. 8. Again, the multiple streams STREAM 1 through STREAM 3 may be for a single media station or for different media stations. In this example, initially, the receiving device 56 buffers an initial amount of each of the streams STREAM 1 through STREAM 3 in order to provide smooth and continuous playback in a manner similar to that which is done for traditional streaming content. For this discussion however, this initial buffering is ignored for clarity and ease of discussion. FIG. 9A illustrates locations of the outputs of the buffers 64-1 through 64-3 (in this case M=3) at an initial time to at which the receiving device 56 begins playback. Note that the locations of the outputs of the buffers 64-1 through 64-3 are represented by corresponding downward arrows labeled 1, 2, and 3 for STREAM 1, STREAM 2, and STREAM 3, respectively. The label for the downward arrow representing the location of the output of the buffer 64-1 for STREAM 1 is circled because STREAM 1 is currently playing.

Figure 9B:
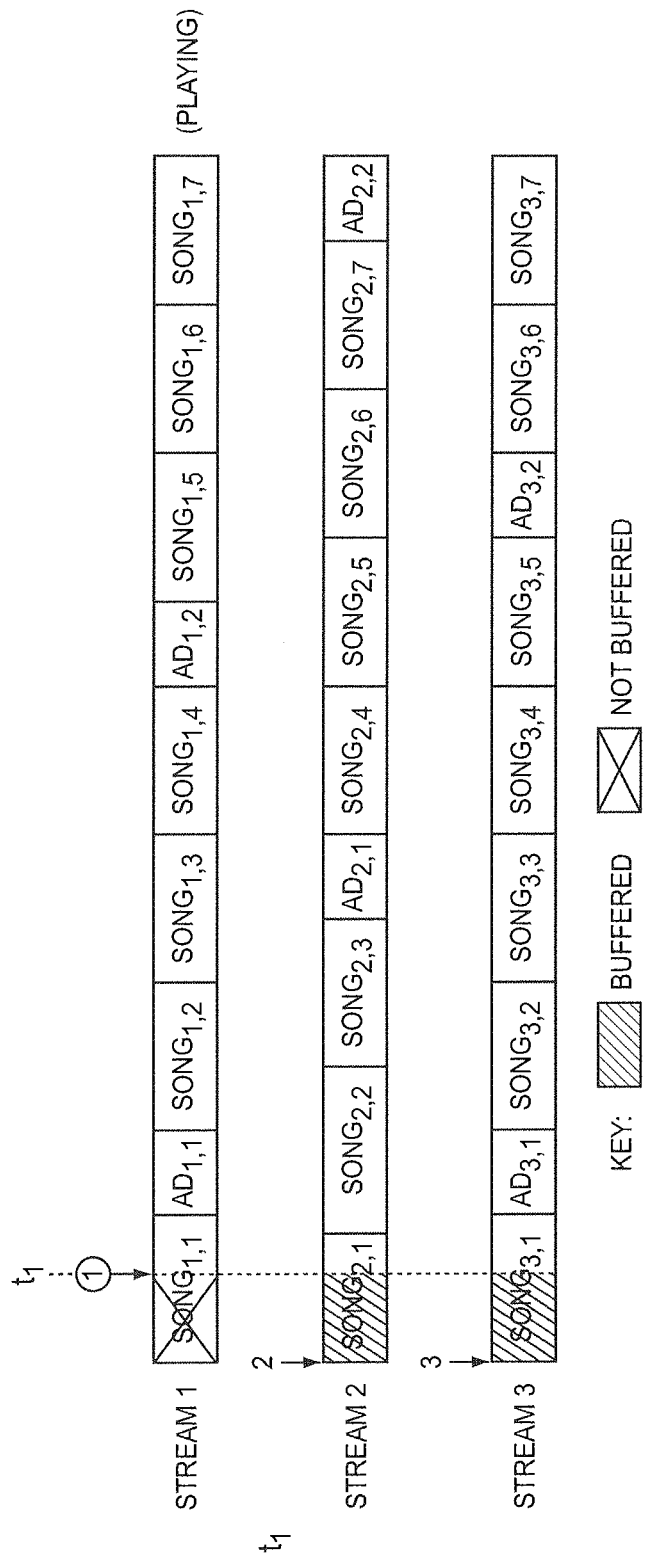

FIG. 9B illustrates the locations of the outputs of the output buffers 64-1 through 64-3 within the content streams STREAM 1 through STREAM 3 after playback of STREAM 1 from time $t_0$ to time $t_1$. During this time, a portion of $SONG_{1,1}$ from STREAM 1 has been playing, a portion of SONG 2,1 is received by the receiving device 56 and stored in the buffer 64-2, and a portion of $SONG_{3,1}$ is received by the receiving device 56 and stored in the buffer 64-3. Note that the locations of the outputs of the buffers 64-2 and 64-3 remain at the start of $SONG_{2,1}$ and $SONG_{3,1}$, respectively, which are the most recent songs streamed on STREAM 2 and STREAM 3.

Figure 9C:
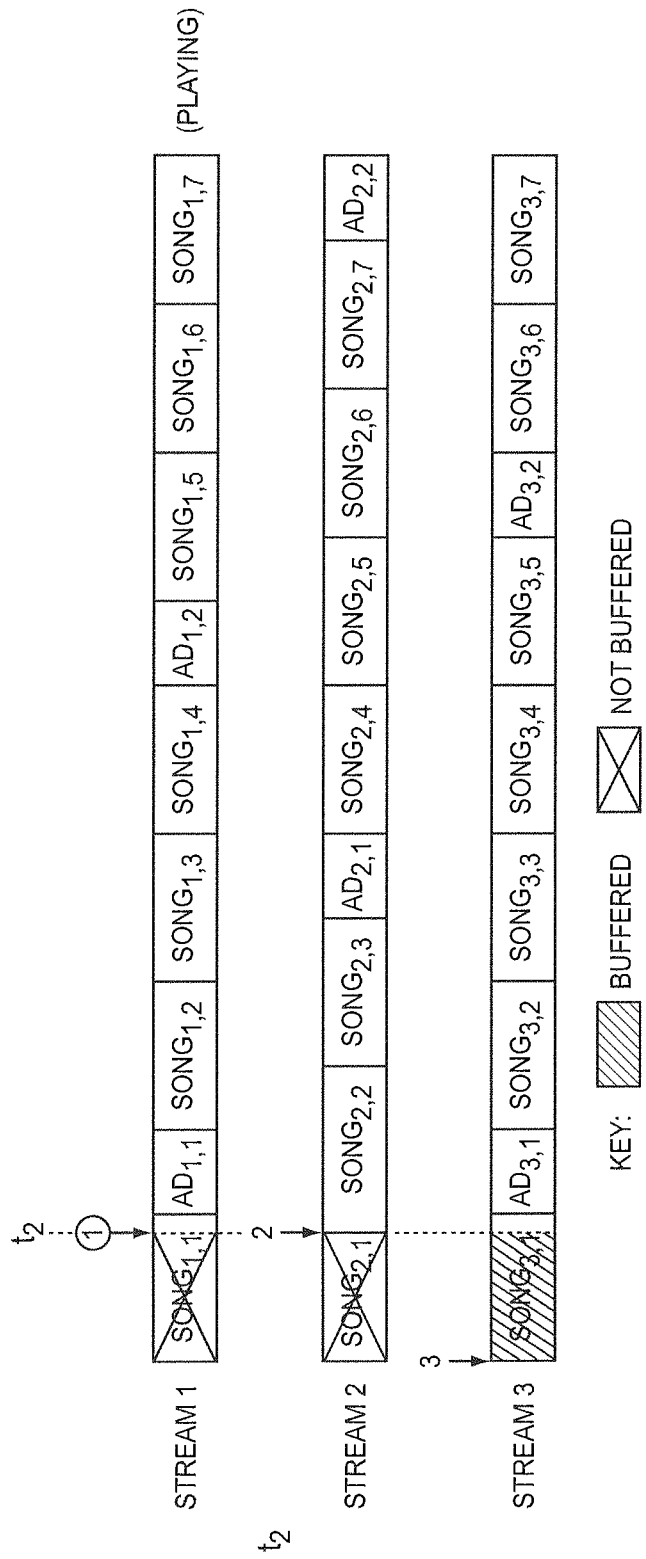

FIG. 9C illustrates the location of the output of the buffer 64-1 within STREAM 1, the location of the output of the buffer 64-2 within STREAM 2, and the location of the output of the buffer 64-3 within STREAM 3 after playback of STREAM 1 continues from time $t_1$ to time $t_2$. At time $t_2$, $SONG_{2,1}$ in STREAM 2 has completed, and $SONG_{2,2}$ in STREAM 2 begins. In this embodiment, only the most recent song played in the auxiliary streams, which at this point are STREAM 2 and STREAM 3, are buffered. As such, the location of the output of the buffer 64-2 for STREAM 2 is set to the start of $SONG_{2,2}$. Note that $SONG_{2,1}$, which was previously stored in the buffer 64-2 for STREAM 2, has been removed from the buffer 64-2 for STREAM 2 in this embodiment. Also, due to the initial buffering of STREAM 1, STREAM 2, and STREAM 3 before starting playback, there is preferably a sufficient amount of $SONG_{2,2}$ already buffered to enable a smooth transition to playback of $SONG_{2,2}$ at time $t_2$ if the user of the receiving device 56 were to initiate a skip.

Figure 9D:
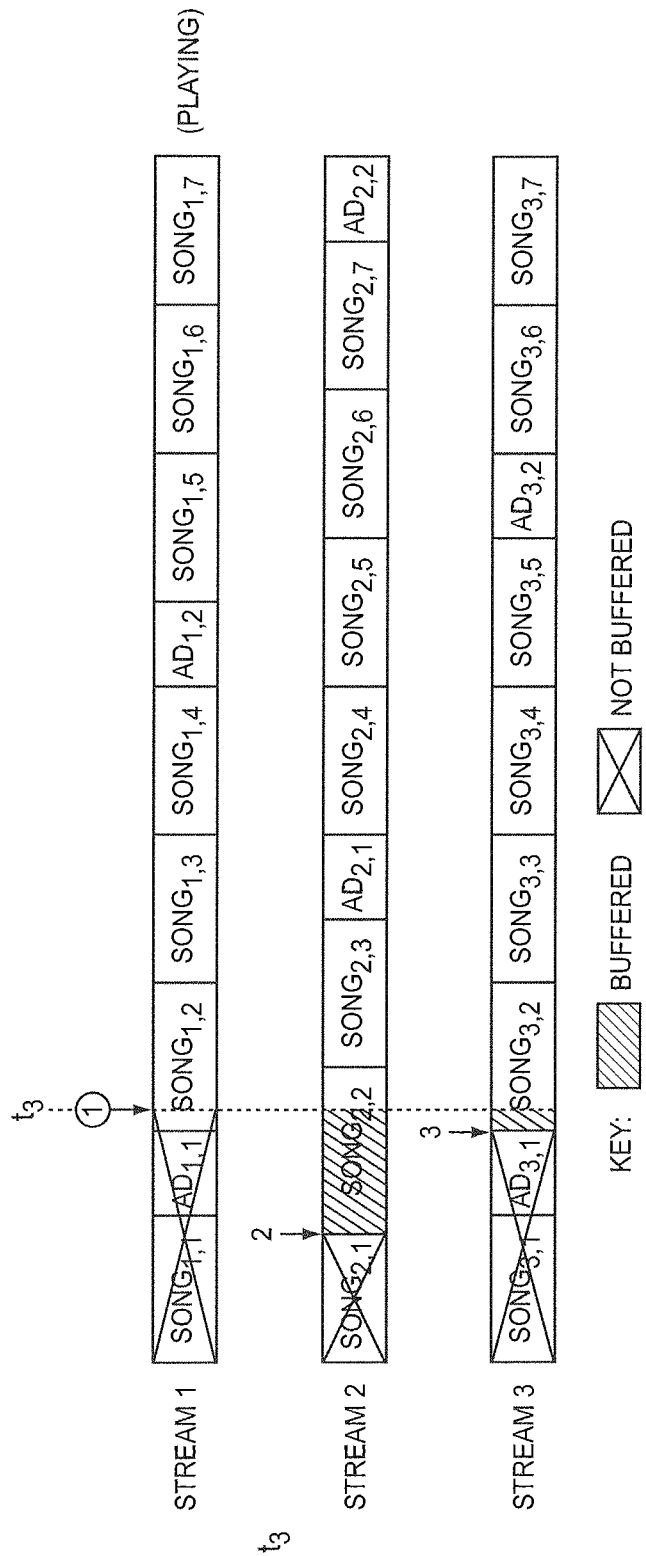

FIG. 9D illustrates the location of the output of the buffer 64-1 within STREAM 1, the location of the output of the buffer 64-2 within STREAM 2, and the location of the output of the buffer 64-3 within STREAM 3 at time $t_3$. During the time from time $t_2$ to time $t_3$, playback of $SONG_{1,1}$ in STREAM 1 has completed and playback of $SONG_{1,2}$ in STREAM 1 has begun. During this time, a portion of $SONG_{2,2}$ is received by the receiving device 56 in STREAM 2 and stored in the buffer 64-2 for STREAM 2. Similarly, during this time, $SONG_{3,1}$ and $AD_{3,1}$ in STREAM 3 have completed and $SONG_{3,2}$ in STREAM 3 has begun. As such, $SONG_{3,1}$ and $AD_{3,1}$ have been removed from the buffer 64-3 for STREAM 3 and a portion of $SONG_{3,2}$ is now stored in the buffer 64-3 for STREAM 3. Note that the locations of the outputs of the buffers 64-2 and 64-3 for STREAM 2 and STREAM 3 remain at the start of $SONG_{2,2}$ and $SONG_{3,2}$, respectively, which are now the most recent songs streamed on STREAM 2 and STREAM 3.

At time $t_3$, the user of the receiving device 56 makes a skip request. In response, the switch 66 (FIG. 8) is controlled to output the buffered STREAM 2 from the buffer 64-2 to begin playback of STREAM 2. In this embodiment, the buffer management function 72 controls the switch 66 in response to the skip request. Alternatively, the skip request may be input directly to the switch 66. Note that in this embodiment, the receiving device 56 sequentially steps through the STREAMS 1 through STREAM 3 as skip requests are received. However, as discussed below, the buffer management function 72 may alternatively select which auxiliary stream to which to switch based on DMCA limitations and/or user preferences. Note that the DMCA limitations may be downloaded from one or more remote sources such as the media station server 12. In addition to or as an alternative to DMCA limitations, one or more rules that restrict the use of content from STREAM 1 through STREAM 3 may be downloaded from one or more remote sources such as, but not limited to, the media station server 12. These rules may be similar to DMCA limitations but may be narrower or looser that the DMCA limitations.

Figure 9E:
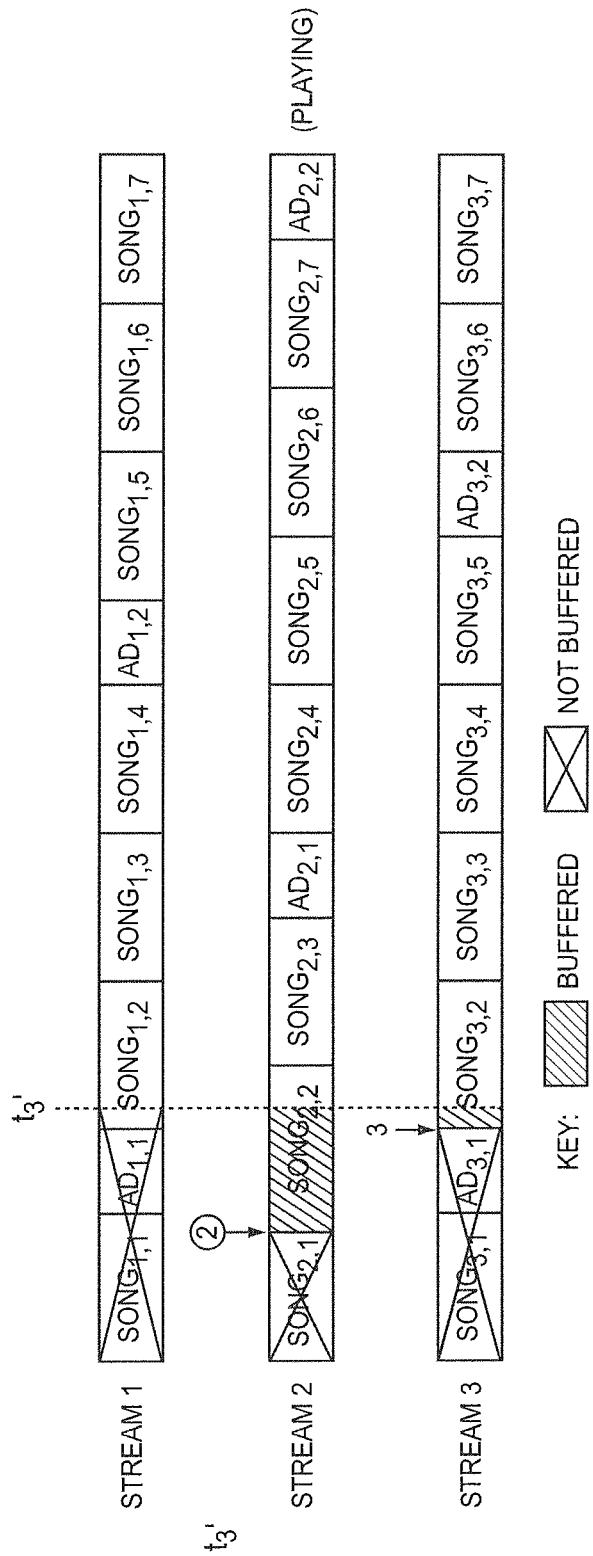

As illustrated in FIG. 9E, because the location of the output of the buffer 64-2 has been maintained at the start of the most recent song streamed on STREAM 2, which in this example is $SONG_{2,2}$, playback of STREAM 2 begins at the start of $SONG_{2,2}$. By switching playback from STREAM 1 to STREAM 2 beginning at the start of $SONG_{2,2}$, the receiving device 56 emulates a skip request. In other words, playback substantially immediately switches from $SONG_{1,2}$ in STREAM 1 to the start of playback of $SONG_{2,2}$ in STREAM 2, thereby emulating a skip feature. In the embodiment where the STREAMS 1 through STREAM 3 are for a single radio station, to the user of the receiving device 56, it appears as though the user has been enabled to skip ahead in the programming of the radio station. In this embodiment, once playback switches to STREAM 2, any remaining portion of the song from which the user skipped, which in this example is $SONG_{1,2}$, is no longer buffered in the buffer 64-1 for STREAM 1.

Figure 9F:
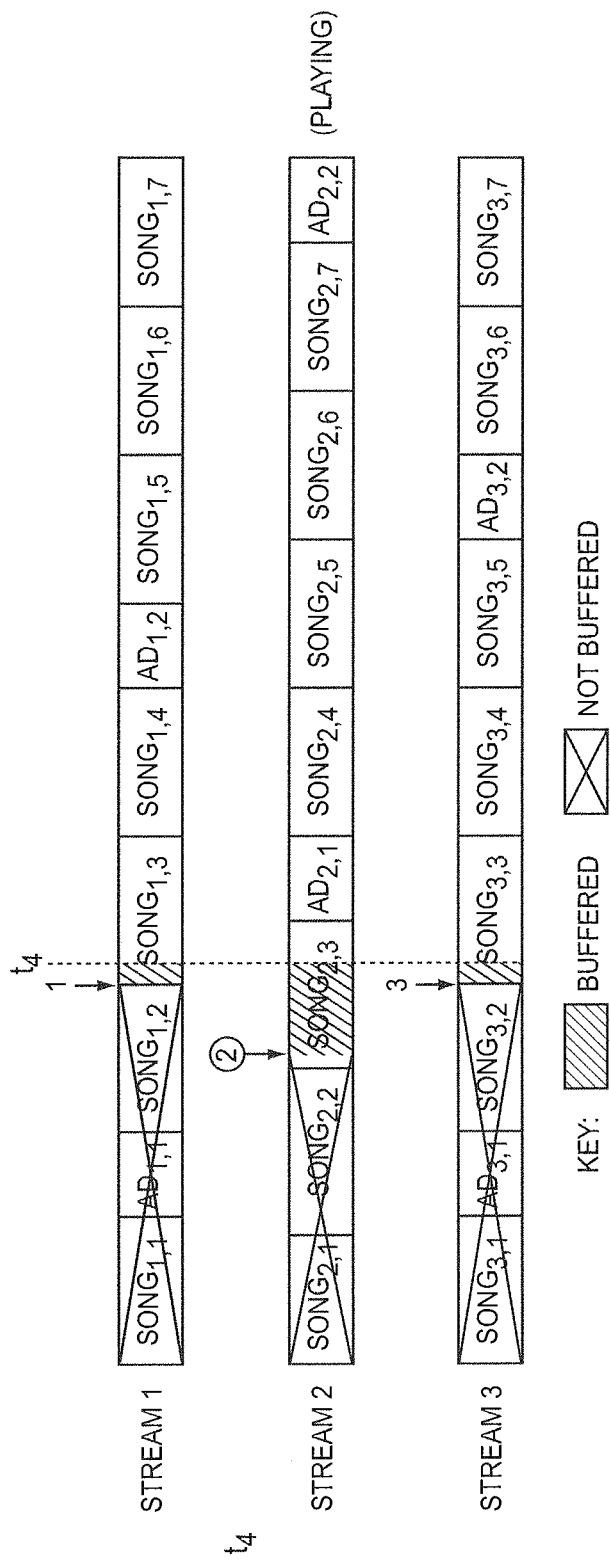

FIG. 9F illustrates the location of the output of the buffer 64-1 within STREAM 1, the location of the output of the buffer 64-2 within STREAM 2, and the location of the output of the buffer 64-3 within STREAM 3 at time $t_4$. During the time from time $t_3$ to time $t_4$, $SONG_{2,2}$ and a portion of $SONG_{2,3}$ has been played from STREAM 2. While $SONG_{2,2}$ and $SONG_{2,3}$ have been playing, $SONG_{1,3}$ has begun in STREAM 1 and, as such, a portion of $SONG_{1,3}$ has been received and stored in the buffer 64-1 for STREAM 1 and the location of the output of the buffer 64-1 for STREAM 1 has been set to the start of $SONG_{1,3}$, which is now the most recent song streamed on STREAM 1. Likewise, while $SONG_{2,2}$ and $SONG_{2,3}$ have been playing, $SONG_{3,2}$ in STREAM 3 has completed and $SONG_{3,3}$ in STREAM 3 has begun. As such, $SONG_{3,2}$ has been removed from the buffer 64-3 for STREAM 3 and a portion of $SONG_{3,3}$ has been received and stored in the buffer 64-3 for STREAM 3. The location of the output of the buffer 64-3 for STREAM 3 has been set to the start of $SONG_{3,3}$, which is now the most recent song streamed for STREAM 3.

At time $t_4$, the user of the receiving device 56 makes a second skip request. In response, the switch 66 (FIG. 8) is controlled to output the buffered STREAM 3 from the buffer 64-3 to begin playback of STREAM 3. In this embodiment, the buffer management function 72 controls the switch 66 in response to the skip request. Alternatively, the skip request may be input directly to the switch 66. Note that in this embodiment, the receiving device 56 sequentially steps through the STREAMS 1 through STREAM 3 as skip requests are received. However, as discussed below, the buffer management function 72 may alternatively select which auxiliary stream to which to switch based on DMCA limitations and/or user preferences.

Figure 9G:
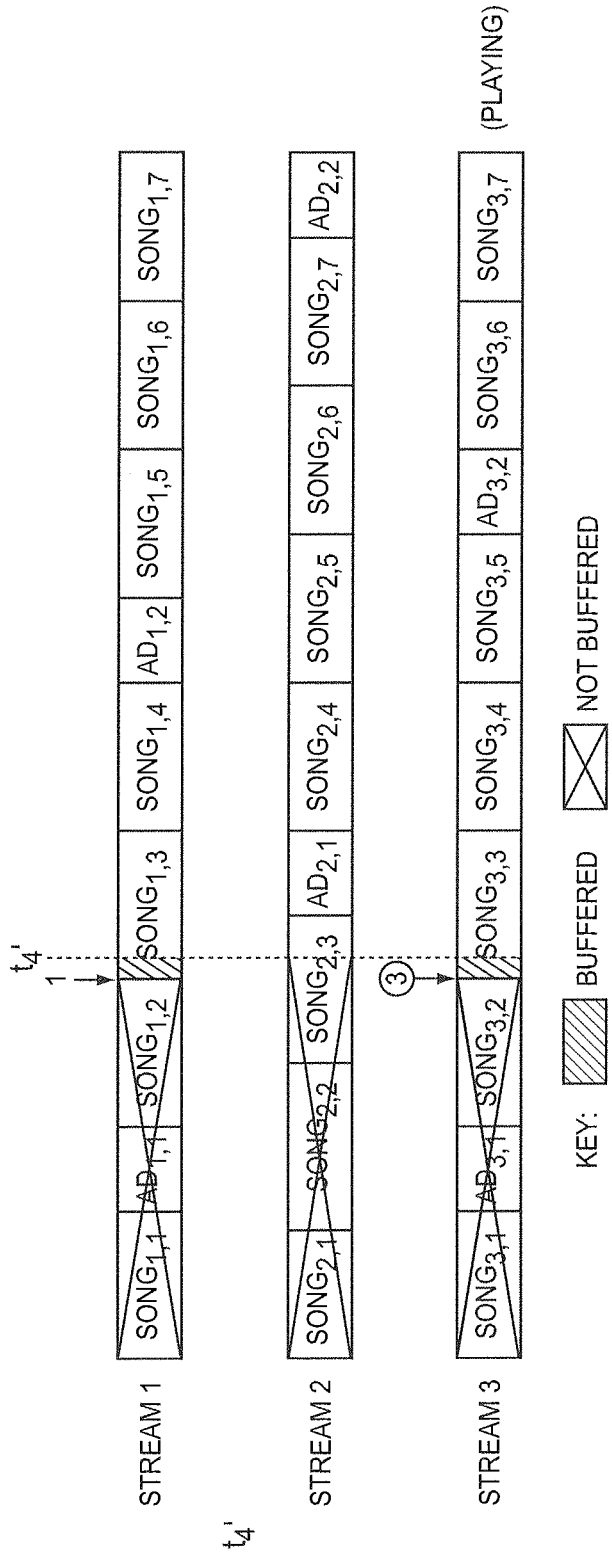

As illustrated in FIG. 9G, because the location of the output of the buffer 64-3 has been maintained at the start of the most recent song streamed on STREAM 3, which in this example is $SONG_{3,3}$, playback of STREAM 3 begins at the start of $SONG_{3,3}$. By switching playback from STREAM 2 to STREAM 3 beginning at the start of $SONG_{3,3}$, the receiving device 56 emulates a skip request. In other words, playback substantially immediately switches from $SONG_{2,3}$ in STREAM 2 to the start of playback of $SONG_{3,3}$ in STREAM 3, thereby emulating a skip feature. In the embodiment where the STREAMS 1 through STREAM 3 are for a single radio station, to the user of the receiving device 56, it appears as though the user has been enabled to skip ahead in the programming of the radio station. In this embodiment, once playback switches to STREAM 3, any remaining portion of the song from which the user skipped, which in this example is $SONG_{2,3}$, is no longer buffered in the buffer 64-2 for STREAM 2.

Figure 9H:
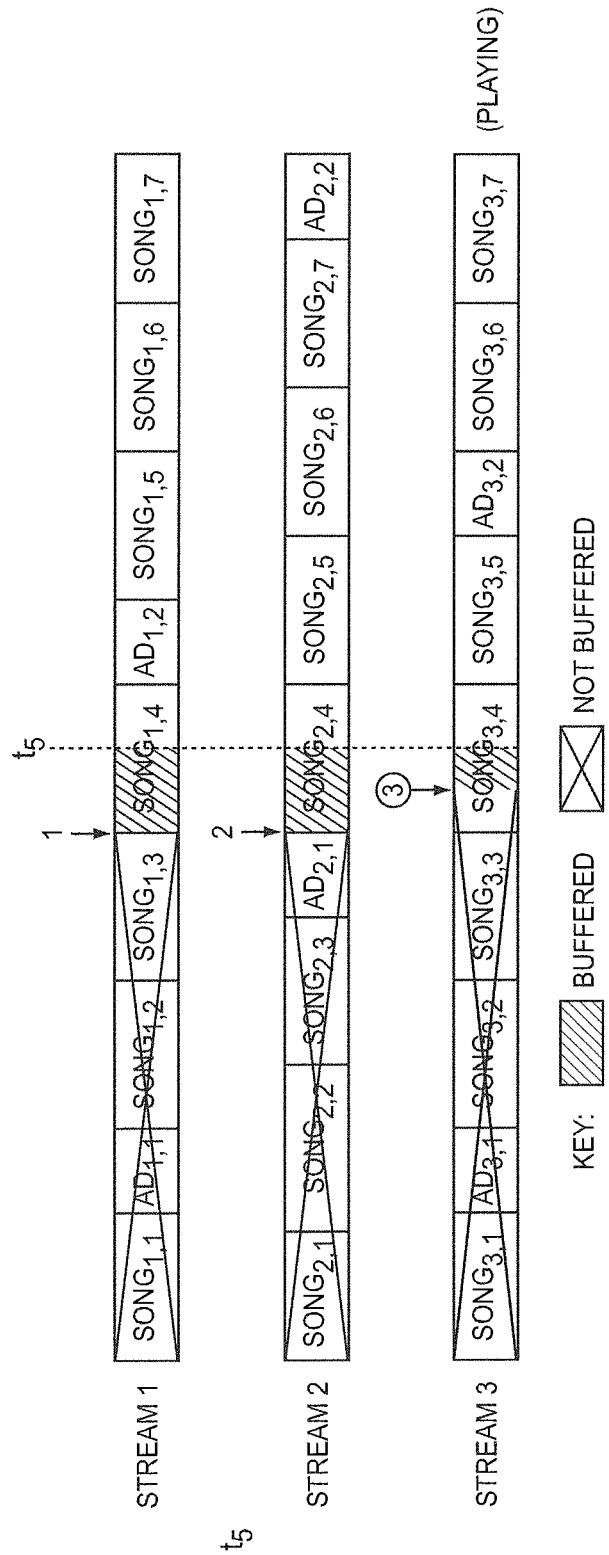
Figure 9I:
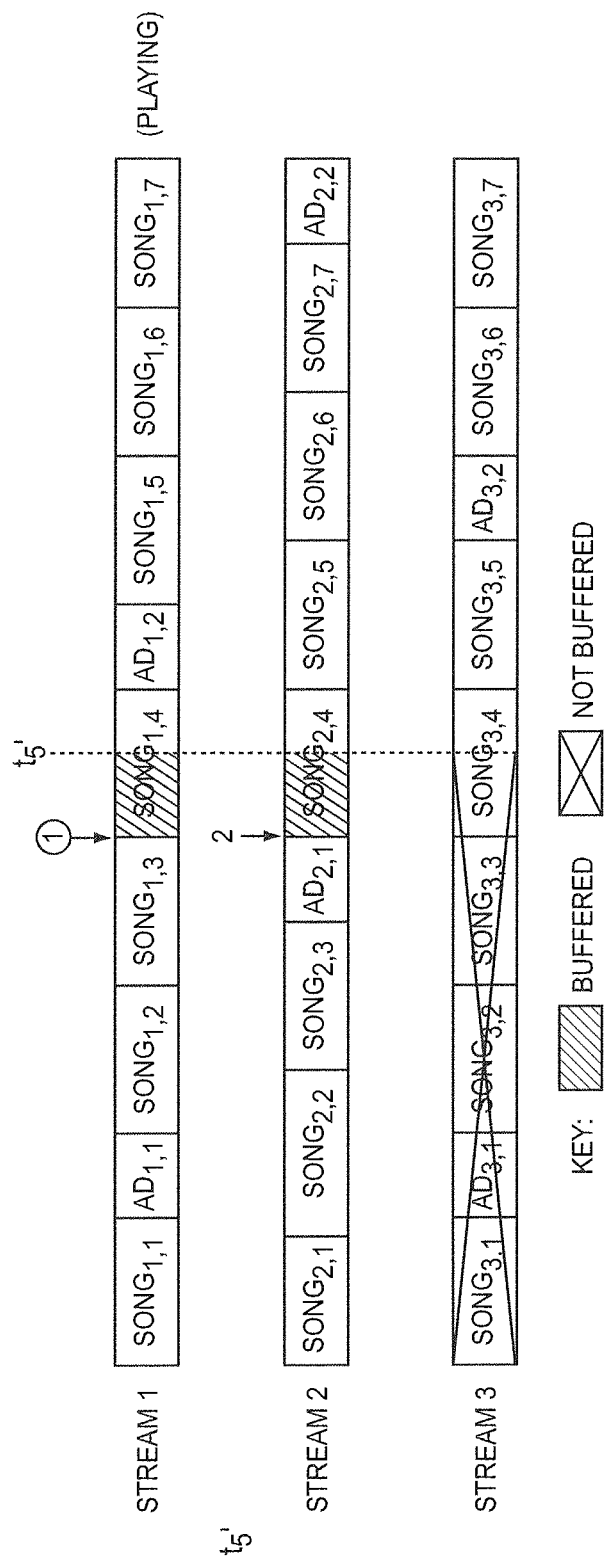

FIGS. 9H and 9I graphically illustrate that upon receiving a third skip request at time $t_5$, playback is switched to the start of the most recent song streamed for STREAM 1. At this point, the process continues as described in order to sequentially step through STREAMS 1 through STREAM 3 to provide the skip function.

FIGS. 10A through 10C graphically illustrate the operation of the buffer management function 72 of FIG. 8 to provide a skip function according to another embodiment of the present disclosure. This embodiment is substantially the same as that described above with respect to FIGS. 9A through 9I. However, in this embodiment, rather than sequentially stepping through STREAM 1 through STREAM 3 as skip requests are received, the buffer management function 72 programmatically selects the auxiliary stream to which to switch based on DMCA limitations and/or user preferences.

More specifically, FIG. 10A illustrates multiple streams STREAM 1 through STREAM 3 simultaneously received by the receiving device 56 of FIG. 8. Again, the multiple streams STREAM 1 through STREAM 3 may be for a single media station or for different media stations. In this example, initially, the receiving device 56 buffers an initial amount of each of the streams STREAM 1 through STREAM 3 in order to provide smooth and continuous playback in a manner similar to that which is done for traditional streaming content. For this discussion however, this initial buffering is ignored for clarity and ease of discussion. FIG. 10A illustrates locations of the outputs of the buffers 64-1 through 64-3 (in this case M=3) at an initial time to at which the receiving device 56 begins playback. Note that the locations of the outputs of the buffers 64-1 through 64-3 are represented by corresponding downward arrows labeled 1, 2, and 3 for STREAM 1, STREAM 2, and STREAM 3, respectively. The label for the downward arrow representing the location of the output of the buffer 64-1 for STREAM 1 is circled because STREAM 1 is currently playing.

As illustrated in FIGS. 10B and 10C, at time $t_1$, the user of the receiving device 56 makes a skip request. In response, the buffer management function 72 determines whether to switch playback to STREAM 2 or STREAM 3. In one embodiment, the buffer management function 72 determines whether switching playback to either STREAM 2 or STREAM 3 would violate any DMCA limitations. More specifically, the buffer management function 72 maintains, or otherwise has access to, a play history of the receiving device 56. The play history may include a list of songs previously played by the receiving device 56 (e.g., Globally Unique Identifiers (GUIDs) of the songs or titles of the songs previously played), times at which those songs were played by the receiving device 56, and, in some embodiments, metadata describing the songs previously played by the receiving device 56 such as, for instance, the artists of the songs, the albums on which the songs were released, or the like. In general, the play history includes any information needed to determine compliance with DMCA limitations. Then, using the play history of the receiving device 56 and data that identifies and, in some embodiments, describes the most recently streamed songs for STREAM 2 and STREAM 3 that are buffered in the buffers 64-2 and 64-3 for STREAM 2 and STREAM 3, which in this example are $SONG_{2,2}$ and $SONG_{3,2}$, the buffer management function 72 determines whether switching playback to either STREAM 2 or STREAM 3 would violate DMCA limitations. For example, if the play history indicates that $SONG_{2,2}$ was recently played and playback of $SONG_{2,2}$ again is not yet permitted (e.g., predefined required amount of time has not yet elapsed since $SONG_{2,2}$ was last played), then switching playback to STREAM 2 may be determined to violate DMCA or other copyright limitations. In this example, switching playback to STREAM 2 where playback would begin at the start of $SONG_{2,2}$ would violate DMCA limitations, but switching playback to STREAM 3 where playback would begin at the start of $SONG_{3,2}$ would not violate DMCA limitations. As such, the buffer management function 72 selects STREAM 3 and controls the switch 66 (FIG. 8) to output the buffered STREAM 3 from the buffer 64-3 to begin playback of STREAM 3. As illustrated in FIG. 10C, because the location of the output of the buffer 64-3 has been maintained at the start of the most recent song streamed on STREAM 3, which in this example is $SONG_{3,2}$, playback of STREAM 3 begins at the start of $SONG_{3,2}$.

In another embodiment, in order to select the stream to which to switch playback in response to the skip request, the buffer management function 72 utilizes user preferences of the user of the receiving device 56. The user preferences may include, for example, one or more preferred music genres, one or more preferred artists, one or more preferred decades, or the like and, optionally, weights assigned thereto. Metadata describing the most recently streamed songs for STREAM 2 and STREAM 3, which in this example are $SONG_{2,2}$ and $SONG_{3,2}$, the buffer management function 72 determines which of most recently streamed songs for STREAM 2 and STREAM 3 most closely matches the user preferences of the user of the receiving device 56. In this example, $SONG_{3,2}$ more closely matches the user preferences of the user. As such, the buffer management function 72 selects STREAM 3 and controls the switch 66 (FIG. 8) to output the buffered STREAM 3 from the buffer 64-3 to begin playback of STREAM 3. As illustrated in FIG. 10C, because the location of the output of the buffer 64-3 has been maintained at the start of the most recent song streamed on STREAM 3, which in this example is $SONG_{3,2}$, playback of STREAM 3 begins at the start of $SONG_{3,2}$.

FIGS. 11A through 11C graphically illustrate the operation of the buffer management function 72 of FIG. 8 according to another embodiment of the present disclosure. In this embodiment, rather than buffering a single most recent media item of the auxiliary streams (i.e., the content streams not currently being played), more than one most recent media item of the auxiliary streams are buffered. Specifically, in this example, at most two most recent media items of the auxiliary streams are buffered.

FIG. 11A illustrates multiple streams STREAM 1 through STREAM 3 simultaneously received by the receiving device 56 of FIG. 8. Again, the multiple streams STREAM 1 through STREAM 3 may be for a single media station or for different media stations. In this example, initially, the receiving device 56 buffers an initial amount of each of the streams STREAM 1 through STREAM 3 in order to provide smooth and continuous playback in a manner similar to that which is done for traditional streaming content. For this discussion however, this initial buffering is ignored for clarity and ease of discussion. FIG. 11A illustrates locations of the outputs of the buffers 64-1 through 64-3 (in this case M=3) at an initial time to at which the receiving device 56 begins playback. Note that the locations of the outputs of the buffers 64-1 through 64-3 are represented by corresponding downward arrows labeled 1, 2, and 3 for STREAM 1, STREAM 2, and STREAM 3, respectively. The label for the downward arrow representing the location of the output of the buffer 64-1 for STREAM 1 is circled because STREAM 1 is currently playing.

FIG. 11B illustrates the locations of the outputs of the output buffers 64-1 through 64-3 within the content streams STREAM 1 through STREAM 3 after playback of STREAM 1 from time $t_0$ to time $t_1$. During this time, numerous songs and advertisements have played from STREAM 1. While STREAM 1 has been playing, STREAM 2 and STREAM 3 have been received by the receiving device 56 and the two most recent songs in each of STREAM 2 and STREAM 3 have been buffered in the buffers 64-2 and 64-3 of STREAM 2 and STREAM 3, respectively. As such, at this point, the location of the output of the buffer 64-2 for STREAM 2 is set to the start of SONG$_{2,4}$, and the location of the output of the buffer 64-3 for STREAM 3 is set to the start of SONG$_{3,4}$.

At time t$_1$, the user of the receiving device 56 makes a skip request. In response, the switch 66 (FIG. 8) is controlled to output the buffered STREAM 2 from the buffer 64-2 to begin playback of STREAM 2. In this embodiment, the buffer management function 72 controls the switch 66 in response to the skip request. Alternatively, the skip request may be input directly to the switch 66. Note that in this embodiment, the receiving device 56 sequentially steps through the STREAMS 1 through STREAM 3 as skip requests are received. However, as discussed below, the buffer management function 72 may alternatively select which auxiliary stream to which to switch based on DMCA limitations and/or user preferences.

As illustrated in FIG. 11C, because the location of the output of the buffer 64-2 has been maintained at the start of the two most recent songs streamed on STREAM 2, which in this example are SONG$_{2,4}$ and SONG$_{2,5}$, playback of STREAM 2 begins at the start of SONG$_{2,4}$. By switching playback from STREAM 1 to STREAM 2 beginning at the start of SONG$_{2,4}$, the receiving device 56 emulates a skip feature. In other words, playback substantially immediately switches from SONG$_{1,5}$ in STREAM 1 to the start of playback of SONG$_{2,4}$ in STREAM 2, thereby emulating a skip feature. In the embodiment where the STREAMS 1 through STREAM 3 are for a single radio station, to the user of the receiving device 56, it appears as though the user has been enabled to skip ahead in the programming of the radio station. In this embodiment, once playback switches to STREAM 2, any remaining portion of the song from which the user skipped, which in this example is SONG$_{1,5}$, is no longer buffered in the buffer 64-1 for STREAM 1. From this point, the process is continued such that playback sequentially steps through STREAMS 1, 2, and 3 in response to subsequent skip requests. Note however, that in one embodiment, upon receiving a subsequent skip request, playback may skip ahead to the next song in STREAM 2.

FIGS. 12A through 12C graphically illustrate the operation of the buffer management function 72 of FIG. 8 to provide a skip function according to another embodiment of the present disclosure. This embodiment is substantially the same as that described above with respect to FIGS. 11A through 11C. However, in this embodiment, rather than sequentially stepping through STREAM 1 through STREAM 3 as skip requests are received, the buffer management function 72 programmatically selects the auxiliary stream to which to switch based on DMCA limitations and/or user preferences.

More specifically, FIG. 12A illustrates multiple streams STREAM 1 through STREAM 3 simultaneously received by the receiving device 56 of FIG. 8. Again, the multiple streams STREAM 1 through STREAM 3 may be for a single media station or for different media stations. In this example, initially, the receiving device 56 buffers an initial amount of each of the streams STREAM 1 through STREAM 3 in order to provide smooth and continuous playback in a manner similar to that which is done for traditional streaming content. For this discussion however, this initial buffering is ignored for clarity and ease of discussion. FIG. 12A illustrates locations of the outputs of the buffers 64-1 through 64-3 (in this case M=3) at an initial time to at which the receiving device 56 begins playback. Note that the locations of the outputs of the buffers 64-1 through 64-3 are represented by corresponding downward arrows labeled 1, 2, and 3 for STREAM 1, STREAM 2, and STREAM 3, respectively. The label for the downward arrow representing the location of the output of the buffer 64-1 for STREAM 1 is circled because STREAM 1 is currently playing.

As illustrated in FIGS. 12B and 12C, at time t$_1$, the user of the receiving device 56 makes a skip request. In response, the buffer management function 72 determines whether to switch playback to STREAM 2 or STREAM 3. In one embodiment, the buffer management function 72 determines whether switching playback to either STREAM 2 or STREAM 3 would violate any DMCA limitations. More specifically, the buffer management function 72 maintains, or otherwise has access to, a play history of the receiving device 56. The play history may include a list of songs previously played by the receiving device 56, times at which those songs were played by the receiving device 56, and, in some embodiments, metadata describing the songs previously played by the receiving device 56 such as, for instance, the artists of the songs, the albums on which the songs were released, or the like. In general, the play history includes any information needed to determine compliance with DMCA limitations. Then, using the play history of the receiving device 56 and, in some embodiments, data that identifies and describes the most recently streamed songs for STREAM 2 and STREAM 3 that are buffered in the buffers 64-2 and 64-3 for STREAM 2 and STREAM 3, which in this example are SONG$_{2,4}$, SONG$_{2,5}$, SONG$_{3,4}$, and SONG$_{3,5}$, the buffer management function 72 determines whether switching playback to either STREAM 2 or STREAM 3 would violate DMCA limitations. In this example, switching playback to STREAM 2 where playback would begin at the start of SONG$_{2,4}$ and then proceed to SONG$_{2,5}$ would violate DMCA limitations, but switching playback to STREAM 3 where playback would begin at the start of SONG$_{3,4}$ and then proceed to SONG$_{3,5}$ would not violate DMCA limitations. As such, the buffer management function 72 selects STREAM 3 and controls the switch 66 (FIG. 8) to output the buffered STREAM 3 from the buffer 64-3 to begin playback of STREAM 3. As illustrated in FIG. 12C, because the location of the output of the buffer 64-3 has been maintained at the start of SONG$_{3,4}$, playback of STREAM 3 begins at the start of SONG$_{3,4}$.

In another embodiment, in order to select the stream to which to switch playback in response to the skip request, the buffer management function 72 utilizes user preferences of the user of the receiving device 56. The user preferences may include, for example, one or more preferred music genres, one or more preferred artists, one or more preferred decades, or the like and, optionally, weights assigned thereto. Metadata describing the most recently streamed songs for STREAM 2 and STREAM 3, which in this example are SONG$_{2,4}$, SONG$_{2,5}$, SONG$_{3,4}$, and SONG$_{3,5}$, the buffer management function 72 determines whether the two most recently streamed songs for STREAM 2 or the two most recently streamed songs for STREAM 3 most closely match the user preferences of the user of the receiving device 56. In this example, SONG$_{3,4}$ and SONG$_{3,5}$ more closely match the user preferences of the user. As such, the buffer management function 72 selects STREAM 3 and controls the switch 66 (FIG. 8) to output the buffered STREAM 3 from the buffer 64-3 to begin playback of STREAM 3. As illustrated in FIG. 12C, because the location of the output of the buffer 64-3 has been maintained at the start of SONG$_{3,4}$, playback of STREAM 3 begins at the start of SONG$_{3,4}$.

The systems and methods described herein provide substantial opportunity for variation without departing from the scope of the present disclosure. For example, in FIG. 8, the architecture of the receiving device 56 is such that the receiving device 56 is either in HD radio or IP radio mode. However, in an alternative embodiment, the receiving device 56 may be configured to simultaneously receive one or more HD radio content streams and one or more IP radio content streams for one or more radio stations. The receiving device 56 may the switch playback between the streams to emulate a skip feature in a manner similar to that described above.

Those skilled in the art will recognize improvements and modifications to the preferred embodiments of the present invention. All such improvements and modifications are considered within the scope of the concepts disclosed herein and the claims that follow.

What is claimed is:

1. A receiving device comprising:
   receiver circuitry adapted to receive multiple content streams;
   a plurality of buffers, each buffer adapted to buffer a content stream of the multiple content streams;
   switching circuitry adapted to output a designated buffer of the plurality of buffers;
   playback circuitry adapted to provide playback of the content stream buffered by the designated buffer; and
   buffer management circuitry adapted to:
      effect the playback of the content stream buffered by the designated buffer;
      control the plurality of buffers such that, for each buffer other than the designated buffer: only a most recent media item received in a content steam buffered by the buffer is buffered and the output of the buffer is set to a start of the most recent media item;
      in response to a skip request, effecting the playback of a second content stream buffered by a second buffer; and
      control the plurality of buffers such that, for each buffer other than the second buffer: only a most recent media item received in a content steam buffered by the buffer is buffered and the output of the buffer is set to a start of the most recent media item,
      wherein the buffer management circuitry is further adapted to:
         increase the rate at which content of a corresponding content stream is clocked out of the designated buffer to effect an increase in the speed of playback of the content stream; and
         decrease the rate at which content of the a corresponding content stream is clocked out of the designated buffer to effect a decrease in the speed of playback of the content stream.

2. The device of claim 1, wherein the device is one of a group consisting of: a personal computer, a mobile smartphone, a network enabled portable media player, a set-top box, and a HD radio receiver.

3. The device of claim 1, wherein the content of the multiple content streams is one of a group of content types consisting of: songs, news, audio advertisements, television programs, movies, and video advertisements.

4. The device of claim 3, wherein the content of the multiple content streams comprises one or more of the content types.

5. The device of claim 1, further comprising an interface wherein the switching circuitry is controlled by the interface.

6. The device of claim 5, wherein the interface is a skip input.

7. The device of claim 6, wherein the skip input is a skip button.

8. A media station server comprising components including:
   a network interface; and
   a controller associated with the network interface, adapted to:
      access media items from a content database;
      generate one or more programming schedules for two or more content streams of a media station, each stream comprising a plurality of media items such that any receiving device receiving the two or more content streams is compliant with one or more digital rights management restrictions during playback of the two or more content streams including skip events that may occur at the receiving device during the playback of the two or more content streams; and
      simultaneously transmit the two or more content streams for the media station,
      wherein the controller is further adapted to:
         increase the rate at which content of a corresponding content stream is clocked out of a buffer to effect an increase in the speed of transmission of the content stream; and
         decrease the rate at which content of a corresponding content stream is clocked out of a buffer to effect a decrease in the speed of transmission of the content stream,
      wherein at least one of the components includes at least one electronic hardware component.

9. The media station server of claim 8, wherein the media station comprises at least one of a radio station and a television station.

10. The media station server of claim 8, wherein in simultaneously transmitting the two or more content streams, the controller is adapted to simultaneously transmit the two or more content streams using one of a group of: a terrestrial broadcast transmission, an Internet Protocol (IP) transmission, and a satellite transmission.

11. The media station server of claim 10, wherein the IP transmission comprises one of a group of: real time streaming and progressive downloading.

12. The media station server of claim 10, wherein the IP transmission comprises a different multicast channel for each of the two or more content streams.

13. The media station server of claim 8, wherein the one or more digital rights management restriction comprise limitations of the Digital Millenium Copyright Act (DMCA).

14. The media station server of claim 8 wherein the one or more digital rights management restrictions include preventing a skip event for a skip from one media item to another media item if the skip would violate the one or more rights management rules.

15. A system in which a skip feature is implemented comprising components including:
   a media station server comprising:
      a network interface; and
      a controller associated with the network interface, adapted to:
         access media items from a content database;
         generate one or more programming schedules for two or more content streams of a media station, each stream comprising a plurality of media items;
         simultaneously transmit the two or more content streams for the media station; and
         send digital rights management restrictions to a receiving device, wherein the digital rights management restrictions enable a skip feature at the receiving device received during playback of the two or more content streams to be compliant with the digital rights management restrictions, and
the receiving device comprising:
  receiver circuitry adapted to receive the two or more content streams;
  a plurality of buffers, each buffer adapted to buffer a content stream of the two or more content streams; and
  control circuitry adapted to:
    output a designated buffer of the plurality of buffers;
    provide playback of the content stream buffered by the designated buffer;
    effect the playback of the content stream buffered by the designated buffer;
    control the plurality of buffers; and
    in response to a skip request, effecting the playback of a second content stream of the two or more content streams buffered by a second buffer of the plurality of buffers in accordance with the digital rights management restrictions,
  wherein the buffer management circuitry is further adapted to:
    increase the rate at which content of a corresponding content stream is clocked out of the designated buffer to effect an increase in the speed of playback of the content stream; and
    decrease the rate at which content of the a corresponding content stream is clocked out of the designated buffer to effect a decrease in the speed of playback of the content stream,
  wherein at least one of the components includes at least one electronic hardware component.

16. The system of claim 15, wherein sending digital rights management restrictions to the receiving device comprises sending limitations of the Digital Millenium Copyright Act (DMCA).

\* \* \* \* \*